(12) United States Patent
Chao et al.

(10) Patent No.: US 7,052,129 B2
(45) Date of Patent: May 30, 2006

(54) UNIVERSAL RESILIENT SHIELDS

(75) Inventors: David Chao, Saratoga, CA (US); Pin Chou, Chiayi (TW); Wei-Lien Huang, Chiayi (TW); Chang-Yung Chang, Chiayi (TW); Chien-Ho Lin, Chiayi (TW); Ruey-Hong Hung, Chiayi (TW)

(73) Assignee: Contour Optik, Inc., Chiayi (TW)

( * ) Notice: Subject to any disclaimer, the term of this patent is extended or adjusted under 35 U.S.C. 154(b) by 0 days.

(21) Appl. No.: 10/741,934

(22) Filed: Dec. 19, 2003

(65) Prior Publication Data

US 2004/0263774 A1 Dec. 30, 2004

Related U.S. Application Data

(60) Provisional application No. 60/485,038, filed on Jul. 7, 2003.

(30) Foreign Application Priority Data

Jun. 26, 2003 (TW) .............................. 92211879 U

(51) Int. Cl.
*G02C 7/10* (2006.01)
(52) U.S. Cl. ..................... 351/44; 351/48; 351/128; 2/13
(58) Field of Classification Search ............. 351/41, 351/44, 47, 48, 57, 58, 124, 125, 126, 128; 2/12, 13, 15
See application file for complete search history.

(56) References Cited

U.S. PATENT DOCUMENTS

| | | | |
|---|---|---|---|
| 1,871,534 A * | 8/1932 | Kimball ........................ | 2/436 |
| 5,080,475 A | 1/1992 | Ferron .......................... | 351/57 |
| 5,229,796 A | 7/1993 | Nitta ........................... | 351/130 |
| 5,321,443 A | 6/1994 | Huber .......................... | 351/47 |
| 5,614,963 A | 3/1997 | Parker .......................... | 351/47 |
| 5,793,463 A | 8/1998 | Hirschman et al. ........... | 351/47 |
| 5,796,461 A | 8/1998 | Stepan ......................... | 351/106 |
| 5,943,114 A | 8/1999 | Grendelmeier ............... | 351/47 |
| 5,953,096 A | 9/1999 | Friedman ..................... | 351/47 |
| 5,980,036 A | 11/1999 | Solomon ...................... | 351/47 |
| 6,036,312 A | 3/2000 | Stepan ......................... | 351/159 |
| 6,062,688 A | 5/2000 | Vinas .......................... | 351/47 |
| 6,234,628 B1 | 5/2001 | Friedman ..................... | 351/48 |

(Continued)

FOREIGN PATENT DOCUMENTS

EP 0357523 3/1990

(Continued)

OTHER PUBLICATIONS

The machine translation of the Japanese document JP-3042602.*

*Primary Examiner*—Huy Mai

(57) ABSTRACT

A number of eyeglass frames with resilient structures and shields that have wide applicability are described. In one embodiment, an auxiliary frame has a resilient structure at its bridge area, and non-uniform shields. The shields have openings at their sides and retaining mechanisms. Due to its resilient nature, the auxiliary frame is adaptable to aftermarket sales for primary frames. In yet another embodiment, a primary frame has a resilient structure at its bridge area and has shields. Such a primary frame again allows it to be comfortably fitted to people whose heads are of different sizes and shapes.

3 Claims, 20 Drawing Sheets

| U.S. PATENT DOCUMENTS | | | | |
|---|---|---|---|---|
| 6,253,388 B1 | 7/2001 | Lando | | 351/48 |
| 6,302,538 B1 | 10/2001 | Friedman | | 351/48 |
| 6,325,506 B1 | 12/2001 | Cooper | | 351/47 |
| 6,371,612 B1 | 4/2002 | Barrows | | 351/48 |
| 6,398,362 B1 | 6/2002 | Masunaga | | 351/47 |
| 6,412,941 B1 | 7/2002 | Xiao | | 351/47 |

| FOREIGN PATENT DOCUMENTS | | |
|---|---|---|
| JP | 3042602 | 8/1997 |
| TW | 366106 | 8/1999 |
| TW | 385868 | 8/1999 |
| TW | 403212 | 8/2000 |

\* cited by examiner

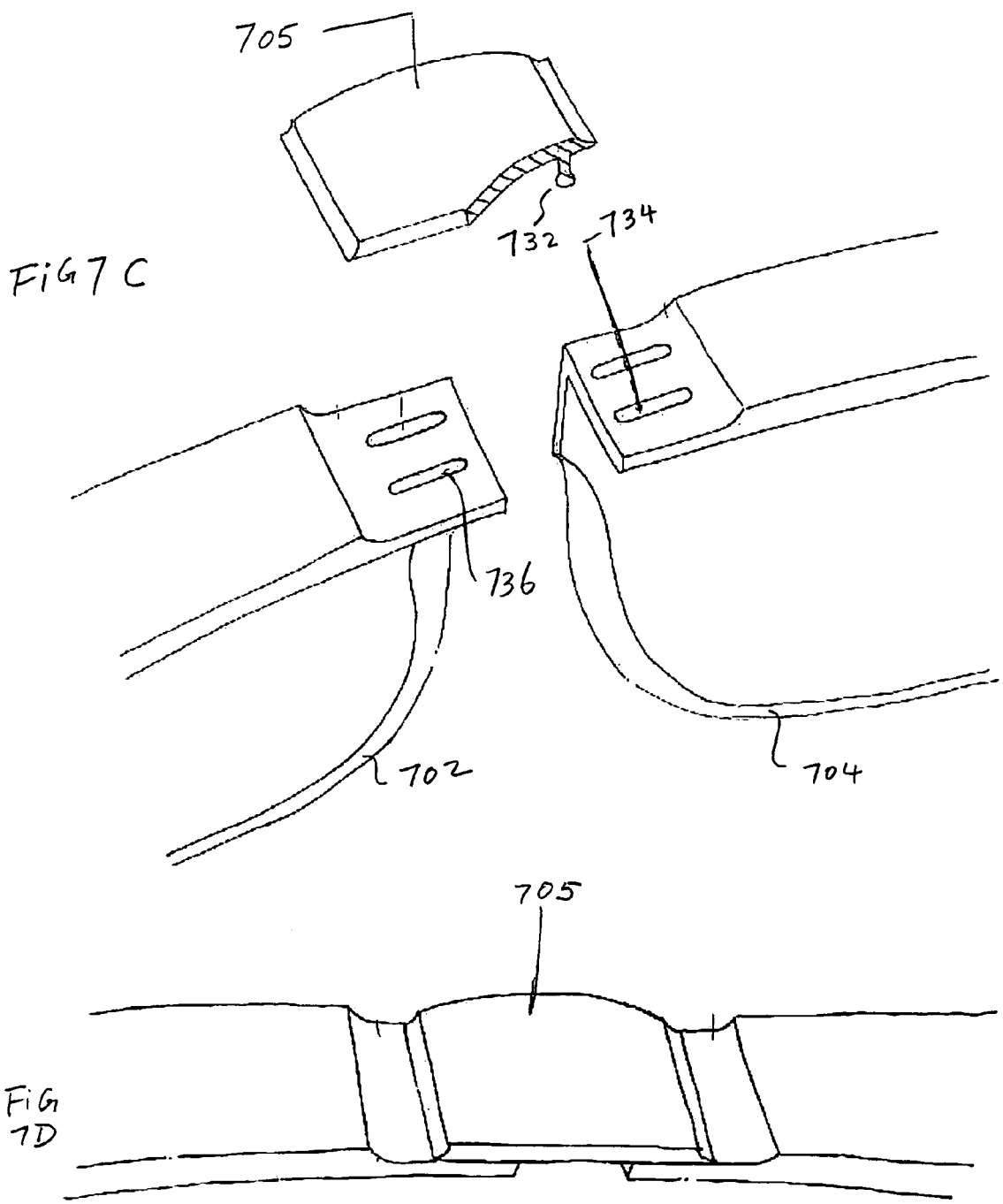

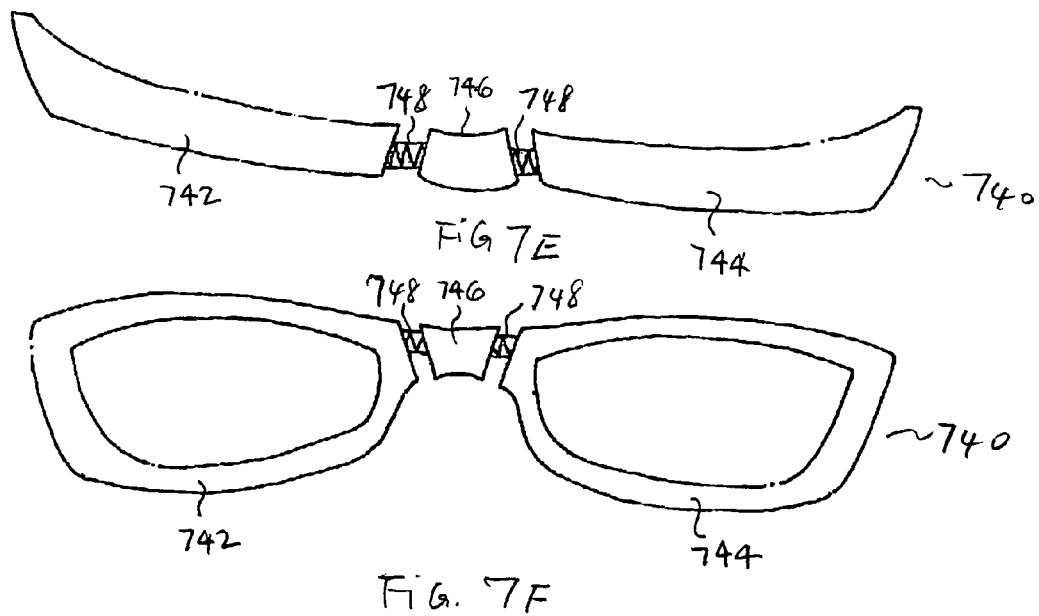
FIG. 7E
FIG. 7F
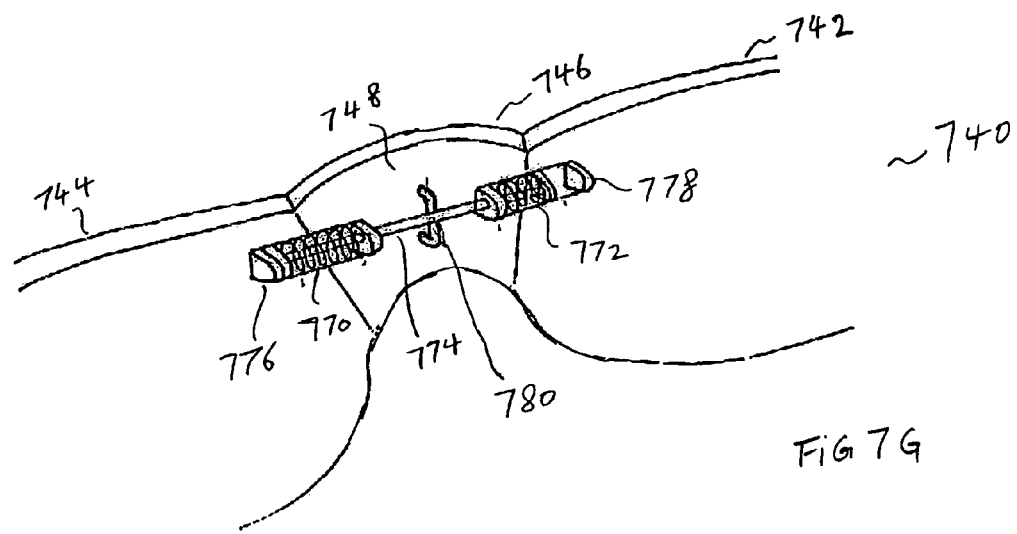
FIG. 7G

UNIVERSAL RESILIENT SHIELDS

CROSS REFERENCE TO RELATED APPLICATION

This application also claims benefit of U.S. Provisional Patent Application No. 60/485,038, filed Jul. 7, 2003, and both entitled "ATTACHABLE AUXILIARY EYE-GLASSES WITH SHIELDING EXTENSION", which are hereby incorporated herein by reference.

BACKGROUND OF THE INVENTION

1. Field of the Invention

The present invention relates generally to eyeglasses and, more particularly, to eyeglass frames with resilient structures and shields.

2. Description of the Related Art

The benefits of sunglasses are undisputed. More and more people are buying auxiliary frames to complement their primary frames. Some auxiliary frames are adjustable and some are not. For the types that are not adjustable, typically each auxiliary frame is made to fit onto a corresponding primary frame. The primary frame and the corresponding auxiliary frame are usually bought together as a set. For the adjustable types, the auxiliary frames are more flexible for primary frames of different sizes. For example, the auxiliary frame can have clips and a spring at its bridge. To fit onto a larger primary frame, the spring is stretched with the clips clamped onto the primary frame.

Another class of auxiliary frames has shields surrounding the edges of the auxiliary frames. The shields reduce the amount of light getting in between the primary and the auxiliary frames, which can be quite annoying to the person wearing the frames. Typically, the shields in the auxiliary frame wrap around the primary frame. However, frames with shields are usually not adjustable.

It should be apparent from the foregoing that there is a need for improved auxiliary frames with shields that can fit onto primary frames of different sizes.

SUMMARY OF THE INVENTION

The present invention-pertains to universal eyeglass frames with resilient structures and shields according to a number of embodiments. In one embodiment, an auxiliary frame with shields can fit onto primary frames of different shapes and sizes. Due to its resilient nature, the auxiliary frame is adaptable to after-market sales for primary frames. The auxiliary frame includes a resilient structure at its bridge that can elastically expand and contract. The frame also includes retaining structures. These structures reduce the likelihood of unintentionally detaching the auxiliary frame from its primary frame.

The shields can have different configurations. In one embodiment, the shields include an opening (or notch) to allow a portion of the primary frame to extend out of the auxiliary frame. For example, the opening can allow the end pieces of the primary frame to be extended. Then, the auxiliary frames can be less bulky and thus, can be lighter in weight.

In another embodiment, the shields are not uniform. For example, since light typically comes from the top, more shield materials are at the top portion of the auxiliary frame than at the bottom portion of the auxiliary frame. In another example, there are more shield materials at the top portion of the auxiliary frame than at its side portion.

In yet another embodiment, shields are not of uniform width. For example, the shape of the shields of the auxiliary frame is made to fit to a normal curved facial profile.

In a further embodiment, shields are made of different materials but serve to attenuate the intensity of light to a certain degree. The materials can, for example, be categorized as transparent, translucent, opaque or air-permeable.

There can also be transparent windows or openings at the side portions of the shields. Such windows and openings allow better peripheral vision.

Regarding the resilient structure, it can include a spring, or a structure made of a memory material, such as a spring steel, memory metal, or memory plastic. The resilient structure can be positioned at different areas in the vicinity of the bridge. For example, the resilient structure can be in the middle, visually superimposing over the bridge of the primary frame, or more on the top side of the bridge.

As to the retaining mechanism, after the primary frame is fitted over the auxiliary frame, the primary lenses can be positioned between the auxiliary lenses and the retaining mechanism. In another embodiment, the retaining mechanism includes protrusions located in the inside of the shields. In yet another embodiment, the shields themselves serve as the retaining mechanism, such as by having some of their surfaces inclining inwards towards the lenses.

In yet another embodiment, a primary frame has a resilient structure at its bridge area and has shields. Such a primary frame is thus able to be comfortably fitted to people whose heads are of different sizes and shapes. Such a primary frame is also well suited for sunglasses.

Other aspects and advantages of the invention will become apparent from the following detailed description, which, when taken in conjunction with the accompanying drawings, illustrates by way of example the principles of the invention.

BRIEF DESCRIPTION OF THE DRAWINGS

FIGS. 7A–7G show more inconspicuous resilient structures in bridges of auxiliary frames according to different embodiments of the present invention.

Same numerals in FIGS. 1–13B are assigned to similar elements in all the figures. Embodiments of the invention are discussed below with reference to FIGS. 1–13B. However, those skilled in the art will readily appreciate that the detailed description given herein with respect to these figures is for explanatory purposes as the invention extends beyond these limited embodiments.

DETAILED DESCRIPTION OF THE INVENTION

A first aspect of the present invention pertains to auxiliary frames for fitting over primary frames. The auxiliary frames have shields (or shielding extensions) that serve to impede undesired light. The auxiliary frames also have a resilient nature that enables the auxiliary frames to be relatively universal as to the primary frames they are suitable to be fitted on. In other words, the auxiliary frames can fit over primary frames of various sized and shapes.

Figure 1:
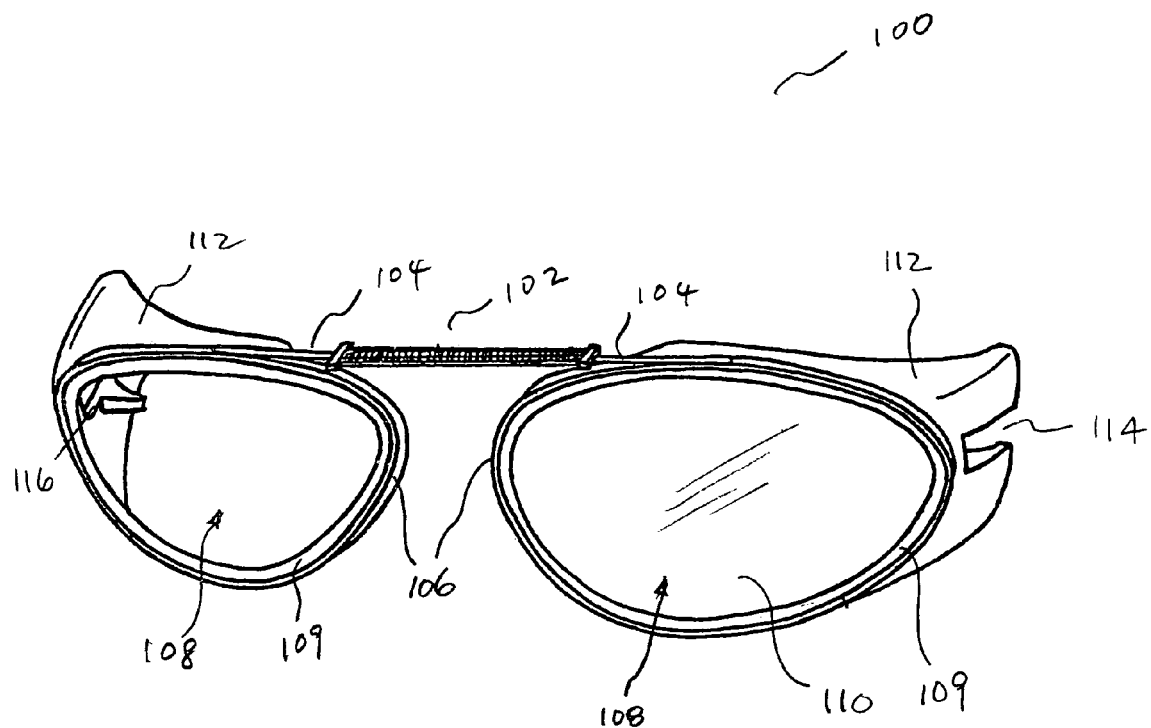
FIG. 1 shows the front view of an auxiliary frame according to one embodiment of the present invention.

FIG. 1 shows a perspective view of an auxiliary frame 100 according to one embodiment of the present invention. The auxiliary frame 100 includes a resilient mechanism, which is a resilient structure 102 at a bridge 104. In this example, the resilient structure 102 and the bridges 104 are separate elements. In another embodiment, the resilient structure 102 can be considered the bridge or a portion of the bridge. The resilient structure 102 can elastically expand and contract within limits. The resilient structure 102 is connected to bridges 104, which are then connected to a frame support structure.

The frame support structure has two sides that are connected by the resilient structure 102. In the example shown in FIG. 1, each side of the frame support structure includes a rim 106. Each rim can have a rim-lock that is not shown in the figure.

The auxiliary frame 100 also includes a pair of lens holding elements 109. The two lens holding elements 109 are connected together via the rims 106, the bridges 104 and the resilient structure 102. In this embodiment, the lens holding elements 109 surround lens openings 108 that receive lenses 110. In another embodiment, the lens holding elements 109 only partially extend about the lens openings 108 as in rimless or semi-rimless frames. In any event, in the embodiment shown in FIG. 1, the lens holding elements are for holding the lenses; and the rims are attached to the lens holding elements, and are also connected to the resilient structure 102.

As shown in FIG. 1, the lens 110 is shown inserted into the lens opening 108 on one side, while the lens opening 108 on the other side has its lens 110 removed. The missing lens can be inserted afterwards. The lens 110 is typically colored or tinted. As an example, the auxiliary frame 100 may serve as sunglasses, thus its lenses 110 may in such case also provide ultraviolet radiation blockage.

The auxiliary frame 100 also includes a pair of shields 112. Each of the shields 112 attaches to the corresponding lens holding element 109. Thus, the lens holding element 109 can serve to couple the shield 112 to the lens 110. In the example shown in FIG. 1, each of the shields 112 can be integral with one of the lens holding elements 109, and no portion of the shields attaches to the resilient structure. The rims 106, held onto the lens holding elements 109, attach to the resilient structure 102.

The shields 112 operate to restricting light from passing through them. For example, the intensity of the light impinging on the shields 112 will be significantly reduced such that a user of the auxiliary frame is not disturbed by such light.

In one embodiment, the shields 112 are non-uniform, or are not uniform across the entire lens holding elements 109. Typically, the shields are located at the top portion of the frame, but do not have to be located at the bottom. One reason is that light typically comes from the top, not the bottom. Another example is that the shields 112 are absent in the vicinity of the bridge of the auxiliary frame, such as between the two lens holding elements 109 in the vicinity of nose pads of glasses. Also, the shields do not need to be of uniform or of even width. As shown in FIG. 1, in regions with shields, the shields are not even-narrower as they move towards the bridge. Such non-uniformity can serve as a better fit to a normally-curved facial profile.

The shields 112 can be made of various materials, such as plastic or metal. The plastic can be transparent, translucent or opaque. For materials being transparent, they are typically colored or tinted. The shields can also be air-permeable. In one embodiment, at least the top portions of the shields are made of materials that significantly reduce or impede light.

Further, the shields 112 can have openings 114 (e.g., notches) and can have retaining structures 116. The openings 114 are provided at each side of the auxiliary frame 100. The openings 114 can allow the end pieces, the side portions or the temple regions of a primary frame to pass through the sides of the shields 112. One benefit of such openings is that the auxiliary frame can be less bulky and does not have to wrap around the entire lens area of the primary frame.

The retaining structures 116 assist in maintaining the auxiliary frame 100 to be fitted over the primary frame. Namely, in this embodiment, the retaining structures 116 provide a surface that helps to hold the auxiliary frame 100 in position with respect to the primary frame. From another perspective, the retaining structures 116 restrict the auxiliary frame from being detached from the primary frame with respect to a first direction. The resilient structure 102 holds the auxiliary frame 100 in position with respect to the primary frame with respect to a second direction. In one embodiment, the second direction is essentially orthogonal to the first direction.

The resilient structure 102 at the bridge enables the flexible expansion of the separation distance between the sides of the auxiliary frame 100. Once expanded, the resilient structure 102 provides a return force (e.g., bias force) to its normal separation distance. This flexible expansion allows the auxiliary frame 100 to fit over primary frames of different sizes, particularly for frames of different widths, accommodated by the flexible expansion. The return force assists holding the auxiliary frame by pressing the auxiliary frame against the primary frame from two opposite sides towards the center of the primary frame. However, such a return force may not prevent the auxiliary frame from being detached from the primary frame in the direction substantially orthogonal to the lenses. The retaining structures 116 reduce the chances of such detachment. As a result, the return force and the retaining structures 116 assist with maintaining the auxiliary frame 100 to be fitted over the primary frames.

In one embodiment, the resilient structure 102, the openings 114 and the retaining structures 116 allow the auxiliary frame 100 to not only cover a very wide range of different primary frames, but also hold the auxiliary frame 100 in place. The auxiliary frame 100 is also able to tightly cover the primary frame so as to be compact, lightweight and aesthetically pleasing.

The resilient structure 102 can provide resiliency in a number of different ways depending upon implementation. For example, the resilient structure 102 can include a spring to supply the resiliency (e.g., return force). In such case, the resilient structure 102 can be referred to as a spring-biased slider where a sliding movement along the bridge can be performed. As other examples, the resilient structure 102 can include a memory material, such as a memory metal wire, a spring steel structure, or a memory plastic.

The resilient structure 102 can be attached to the shields, the lens holding elements, or the rims in any of a variety of ways. In one implementation, a screw or bolt might be used to attach the structure 102. In another implementation, the resilient structure can be integrated with the shields or the lens holding elements, such as by injection molding. In yet another implementation, the resilient structure can be held by an adhesive, or soldered or welded in place. In a further embodiment, the attachment mechanism includes a reverse hook. The resilient structure can include such a hook. Once the hook goes into an aperture, it would be difficult to remove the hook without ruining the aperture.

Although FIG. 1 provides the rims 106, according to another embodiment, the rims are not required. For example, the resilient structure 102 can be attached directly to the lens holding elements.

Also, the lenses can be bonded to or integrally formed with the lens holding elements 109 as a unitary structure. Such a structure can be made by injection molding. The bridge 104 or the resilient structure 102 can be attached to the lens holding elements or the shields to provide the resilient movement.

Figure 2A:
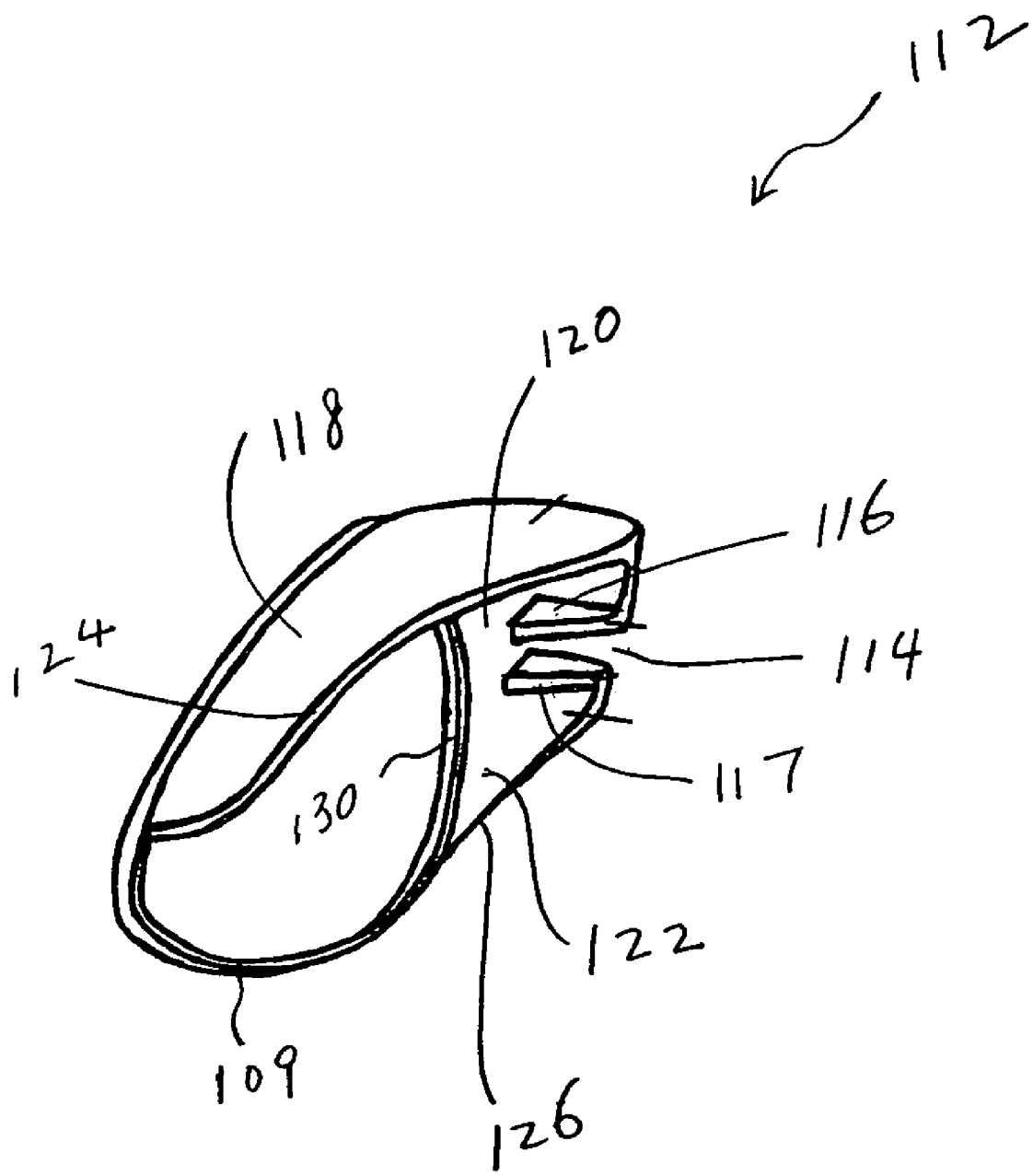
FIG. 2A shows a shield with a retaining structure and an opening according to one embodiment of the present invention.

FIG. 2A shows a perspective view of the shield 112 with a retaining structure 116 and an opening 114 according to one embodiment of the present invention. The shield 112 pertains to a right-side shield (from the user's perspective) for the auxiliary frame 100 shown in FIG. 1. The shield 112 includes the opening 114 and a pair of the retaining structures 116. The retaining structures 116 can be made of elastic or rigid materials.

In the embodiment shown in FIG. 2A, each side of the opening 114 has one retaining structure 116. Each of the retraining structures 116, in this embodiment, also has a tapered surface 117 to facilitate assemble with a primary frame. The retaining structures 116 can reduce the likelihood that the auxiliary frame 100 will be unintentionally detached from a primary frame.

The shield 112 shown in FIG. 2A includes a top shield 118, a side shield 120 and a bottom shield 122. The top shield 118 has a top shield inner contour 124, and the bottom shield 122 has a bottom shield inner contour 126. The inner contours 124, 126 facilitate comfortable and form-fitting coupling to the user's facial profile when wearing the auxiliary frame 100.

In this embodiment, it should be noted that the top shield 118 is substantially wider and extends much closer to the bridge than the bottom shield 122. Typically, most of the bothersome light to be blocked, suppressed or attenuated is from light sources located above the user's head. As a result, the top shield 118 tends to have more surface area than the bottom shield 122. The bottom shield 122 can be considered optional. Although the side shield 120 would normally serve to attenuate light, it may be desirable to better facilitate transmission of light through at least a portion of the side shield 120.

The ability for a user to see out of the side shield 112 can be advantageous, namely, to facilitate peripheral vision. In other words, it can be beneficial for the user to see through at least a portion of the side shield 112. This can be accomplished by having at least a portion of the side shields being partially transparent (e.g., colored or tinted), clear, or having holes, windows or openings.

Figure 2B:
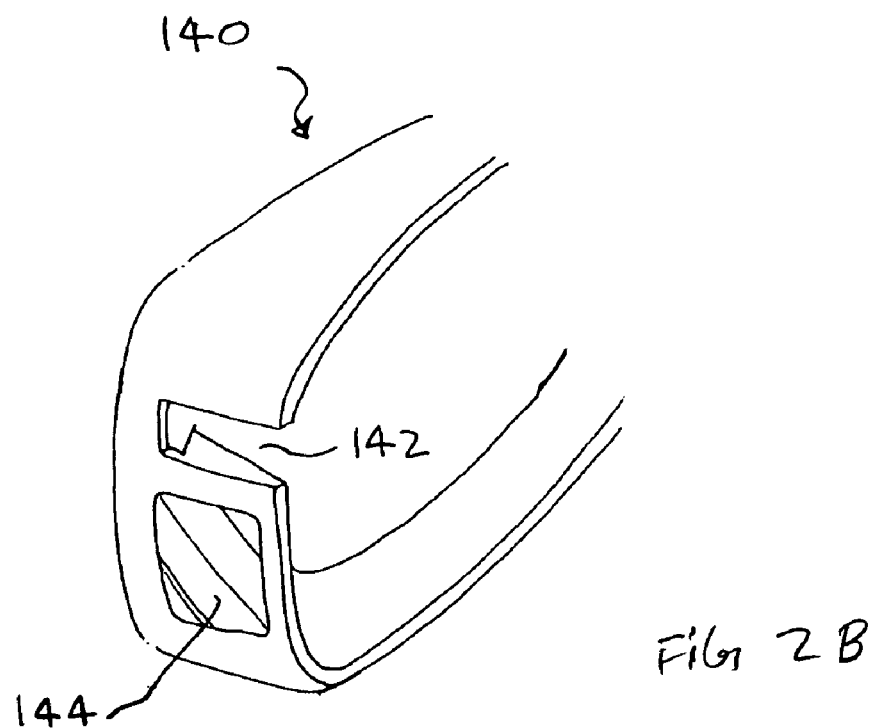
FIGS. 2B–2E show exemplary configurations for side shields according to different embodiments of the invention.
Figure 2C:
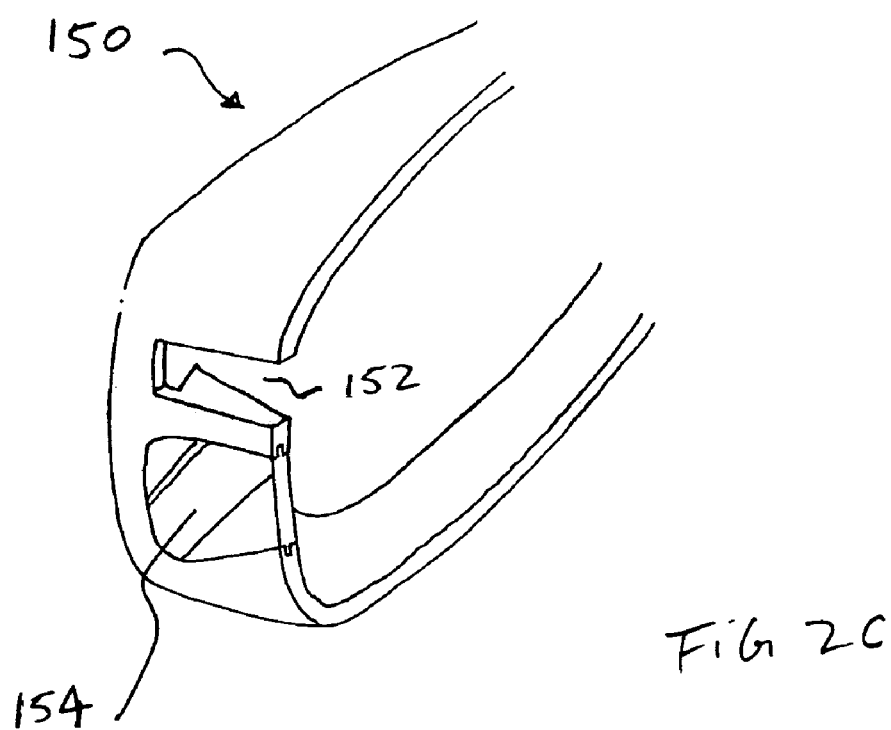
Figure 2D:
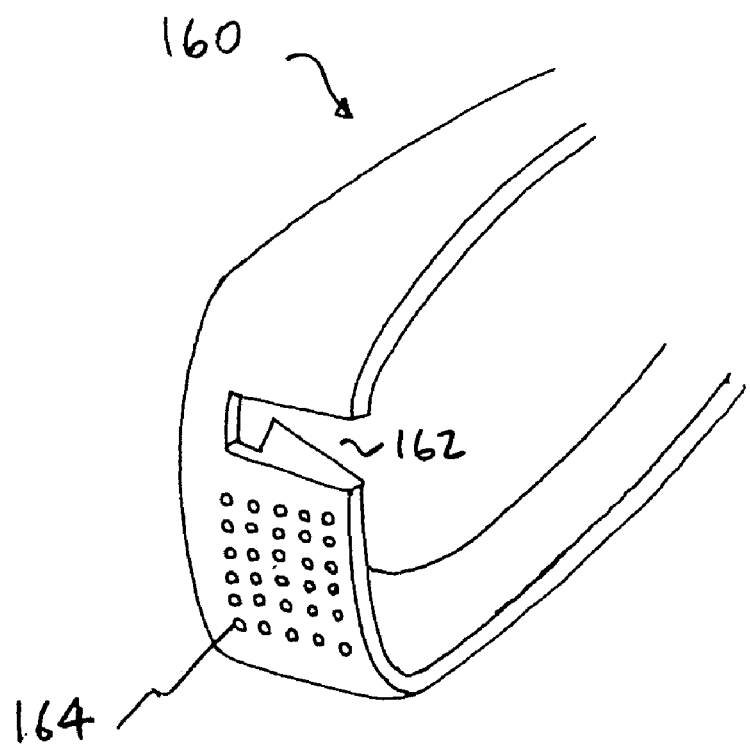
Figure 2E:
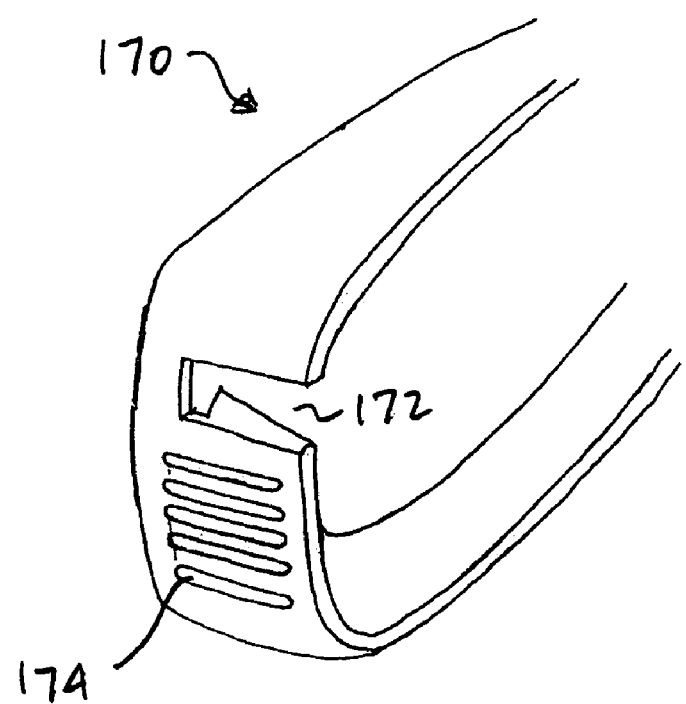

The side shields can also have different regions with different characteristics. FIGS. 2B–2E show exemplary configurations for side shields according to different embodiments of the invention. FIG. 2B shows a side shield 140 having an opening 142 and a window 144. The window 144 is at least partially transparent so that the user of a frame having the side shield 140 can see through the window 144. The window 144 also typically has greater transparency than other portions of the shield. FIG. 2C shows a side shield 150 having an opening 152 and a window 154. The at-least-partially-transparent window 154 extends to the edge of the side shield. FIG. 2D shows a side shield 160 having an opening 162 and holes 164. The holes 164 can assist the user in seeing out of the side shield 160, and can also allow air-permeability. FIG. 2E shows a side shield 170 having an opening 172 and slots 174. Again, the slots 174 can assist the user in seeing out of the side shield 170.

Referring back to FIG. 2A, the shield 112 can be integrally formed with the lens holding element 109. The top shield 118, the side shield 120 and the bottom shield 122 can all be integral formed with the lens holding element 109. Alternatively, the top shield 118, the side shield 120 and the bottom shield 122 can be separate pieces that are bonded to the lens holding element 109. An inner surface 130 of the lens holding element 109 can receive a lens.

Figure 3:
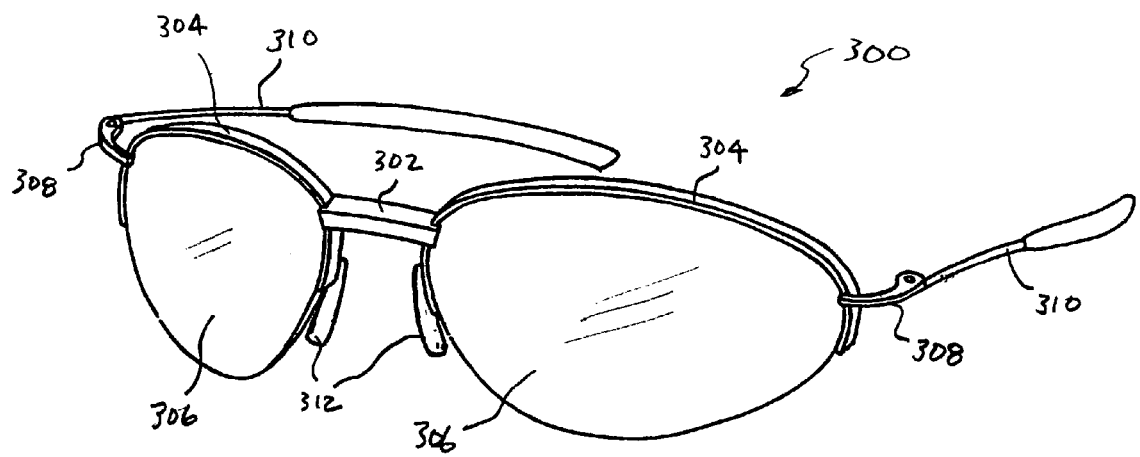
FIG. 3 shows a perspective view of a conventional primary frame.

In general, as noted above, an auxiliary frame according to the invention fits over a primary frame. FIG. 3 shows a perspective view of a conventional primary frame 300. The primary frame 300 is merely a representative frame as the invention works with various other types and designs of primary frames. The primary frame 300 has a bridge 302 that couples together a pair of lens holding elements 304 or rims. The lens holding elements 304 have lenses 306 attached thereto. Additionally, end pieces 308 can attach to the lens holding elements 304 with a pair of arms 310 attached to the end pieces 308. The primary frame 300 also includes nose pads 312 to support the primary frame 300 with respect to the user's nose.

Figure 4A:
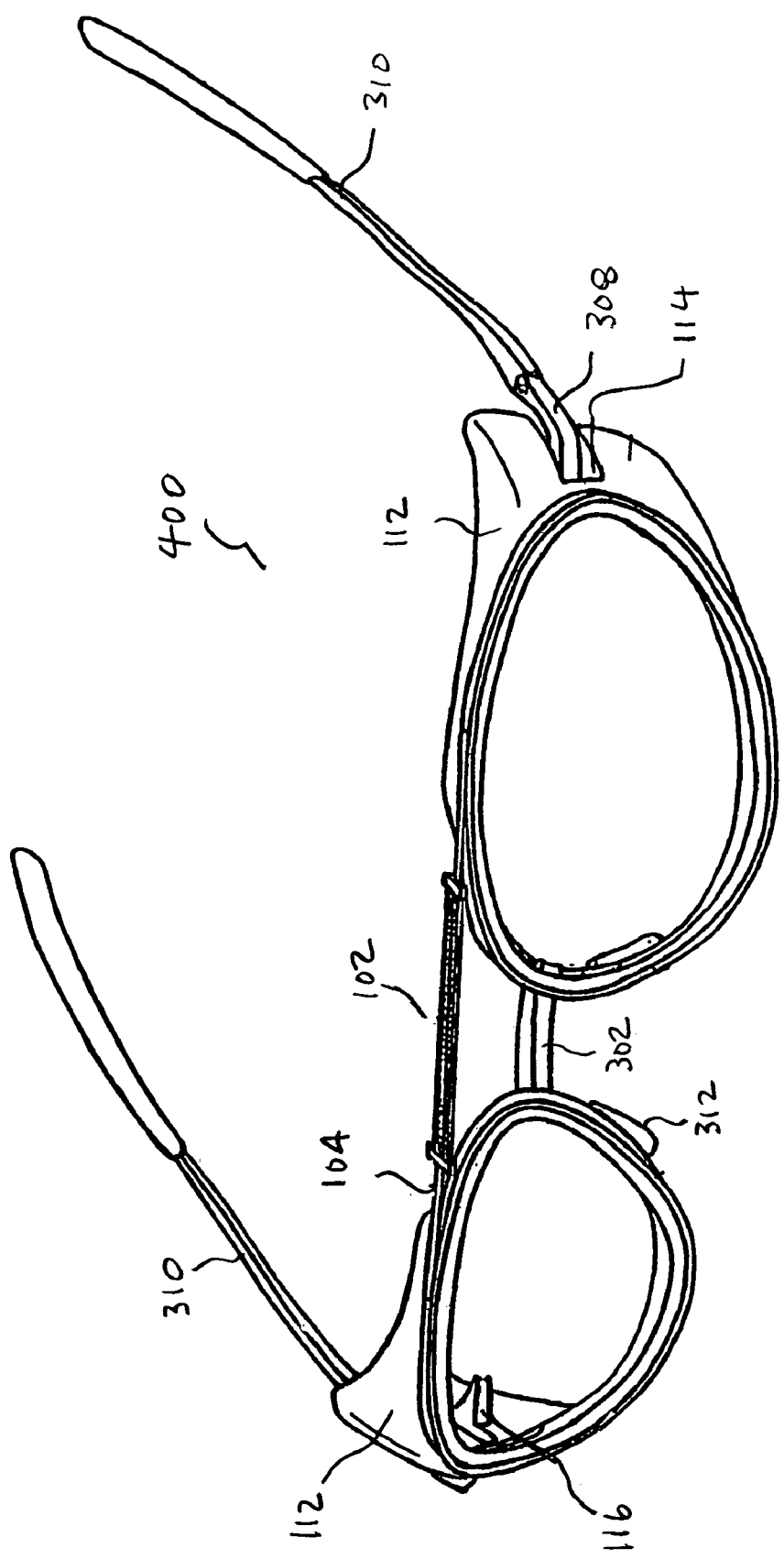
FIG. 4A shows a perspective view of an assembly of an auxiliary frame fitted over a primary frame according to one embodiment of the present invention.

FIG. 4A shows a perspective view of an assembly 400 of an auxiliary frame fitted over a primary frame according to one embodiment of the present invention. More particularly, FIG. 4A illustrates the assembly 400 of the auxiliary frame 100 of FIG. 1 fitted over the primary frame 300 shown in FIG. 3. As assembled, the shields 112 of the auxiliary frame 100 surround at least a portion of the lens holding elements 304 and the lenses 306 of the primary frame 300. Further, the shields extend inward towards the user and over at least a portion of the primary frame, to not only impede light but also to provide an aesthetically pleasing design. Note that the assembly 400 illustrates the end pieces 308 of the primary frame 300 extending through the openings 114 of the auxiliary frame 100. In the assembly 400, the lenses 306 of the primary frame 300 are illustrated as being clear, and the lenses 108 of the auxiliary frame 100 are not present (i.e., removed or not yet inserted).

Figure 4B:
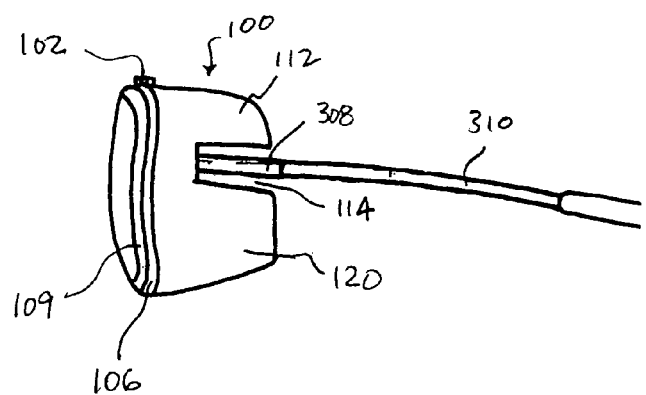
FIGS. 4B–C are different views of the assembly shown in FIG. 4A according to different embodiments of the present invention.

FIG. 4B is a side view of the assembly 400 shown in FIG. 4A. As shown in FIG. 4B, the side shield of the auxiliary frame 100 largely covers the side view of the primary frame 300.

Figure 4C:
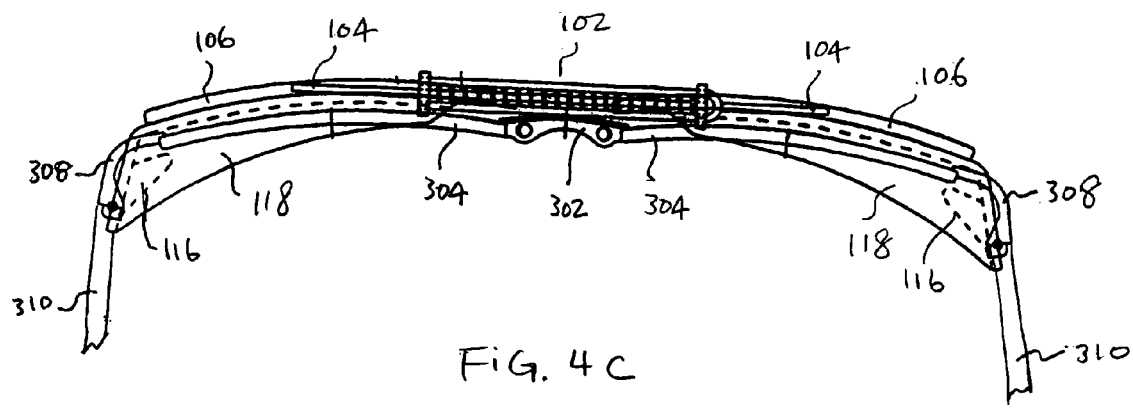

FIG. 4C is a top view of the assembly 400 shown in FIG. 4A. As shown in FIG. 4C, from the top view, the resilient structure 102, the bridge 104, the rim 106 and the top shield 118 of the auxiliary frame 100 are visible. Although most of the lens holding elements 304 of the primary frame 300 are covered by the top shields 118, a central portion of the lens holding elements 304 in the vicinity of the bridge 302 are visible in this embodiment. Further, as assembled, the retaining structures 116 abut or almost abut against the inner surface of the lens holding elements 304 in the vicinity of the end pieces 308 of the primary frame 300, thereby holding the auxiliary frame 100 in the assembled position with respect to the primary frame 300.

Figure 4D:
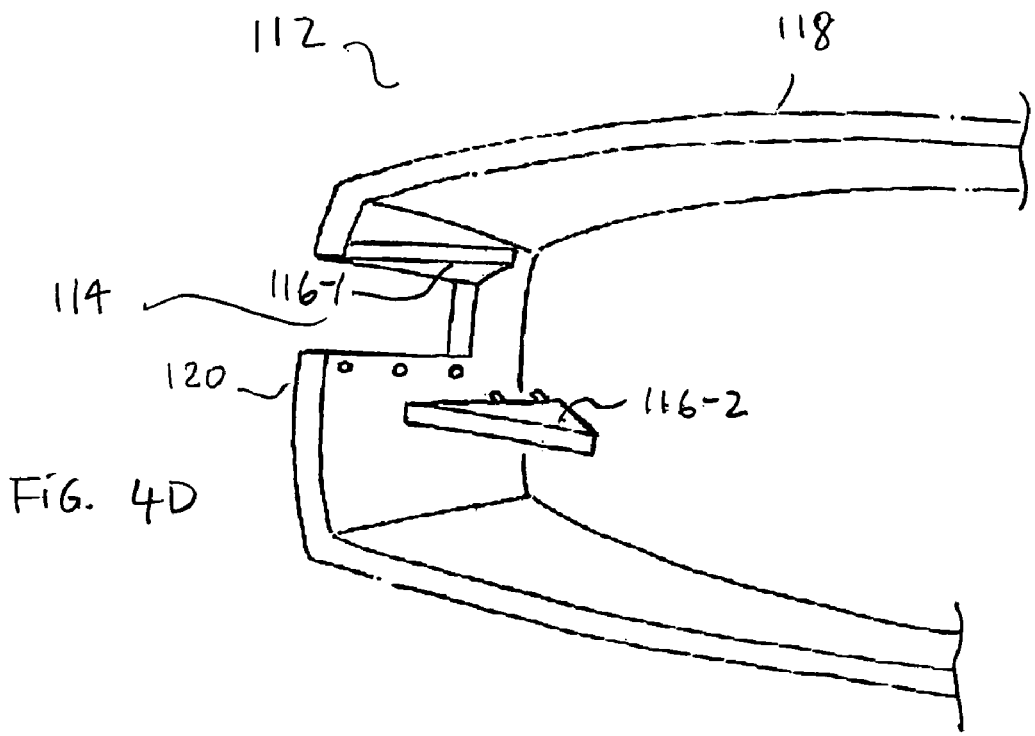
FIG. 4D is a partial rear view of the shield according to one embodiment of the present invention.
Figure 4E:
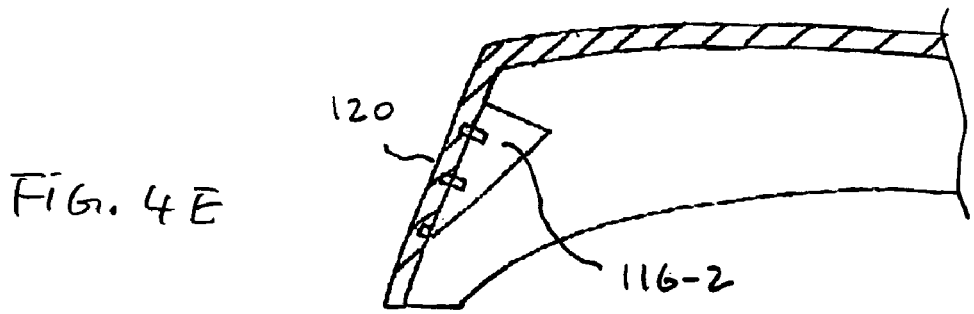
FIG. 4E shows a partial cross-sectional view of the shield with the retaining structure attached to the side shield.
Figure 4F:
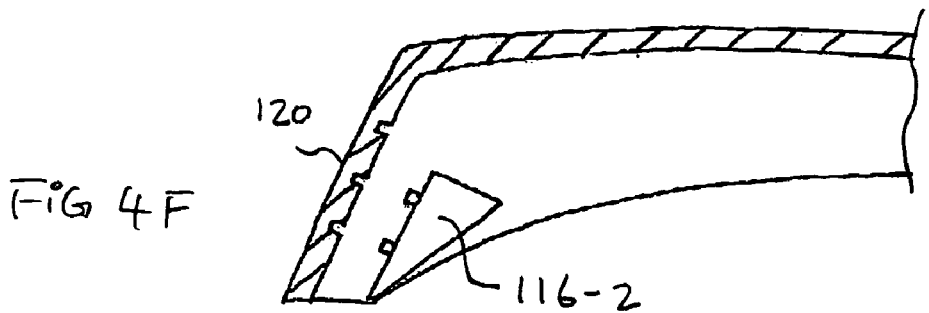
FIG. 4F shows a partial cross-sectional view of the shield with the retaining structure detached from the side shield according to one embodiment of the present invention.

FIG. 4D is a partial rear view of the shield 112 according to one embodiment of the present invention. The shield 112 has retaining structures 116-1 and 116-2 adjacent the opening 114 in the side shield 120. In this embodiment, the retaining structures 116-1 and 116-2 are separate components attachable to and detachable from the shield 112. For example, as shown in FIG. 4D, the retaining structure 116-2 attaches to the shield 112 using pegs and holes. FIG. 4E shows a partial cross-sectional view of the shield 112 with the retaining structure 116-2 attached to the side shield 120. FIG. 4F shows a partial cross-sectional view of the shield 112 with the retaining structure 116-2 detached from the side shield 120. Further, the position of the retaining structures 116-1 and 116-2 within the inside of the shield 112 can be adjustable, such as based on the pegs and holes configuration. Such adjustment can server to better accommodate the size of the primary frame to which the auxiliary frame fits over. In an alternative embodiment the retaining structures 116-1 and 116-2 can be integrally formed with the shield 112.

Figure 5A:
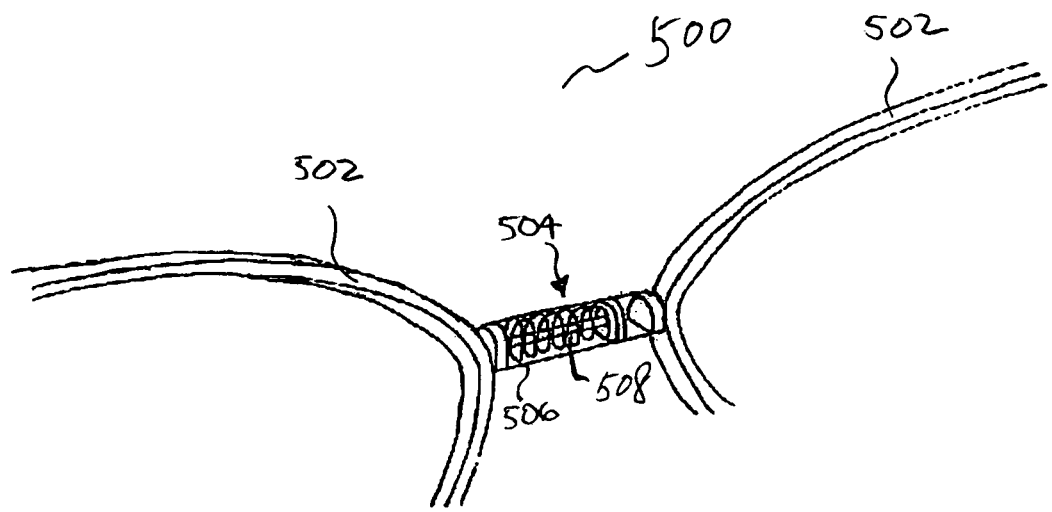
FIG. 5A is a partial view of an auxiliary frame according to an embodiment of the present invention.

FIG. 5A is a partial view of an auxiliary frame 500 according to another embodiment of the present invention. The auxiliary frame 500 has a pair of rims 502 and a resilient structure 504. The resilient structure 504 is attached to the pair of rims 502, and is located between them, more towards the middle of the rims from the elevation perspective. The resilient structure 504 can be in a position that is visually superimposed over the bridge of the primary frame when the frames are fitted over each other. Anyway, the resilient structure 504 serves as a resilient bridge that holds the pair of rims 502 together in a resilient manner. The resilient structure 504 has a cover 506 that encloses a spring 508, which provides the resiliency. The cover 506 provides complete or partial coverage of the spring 508 so that the auxiliary frame 500 can be more aesthetically pleasing.

Figure 5B:
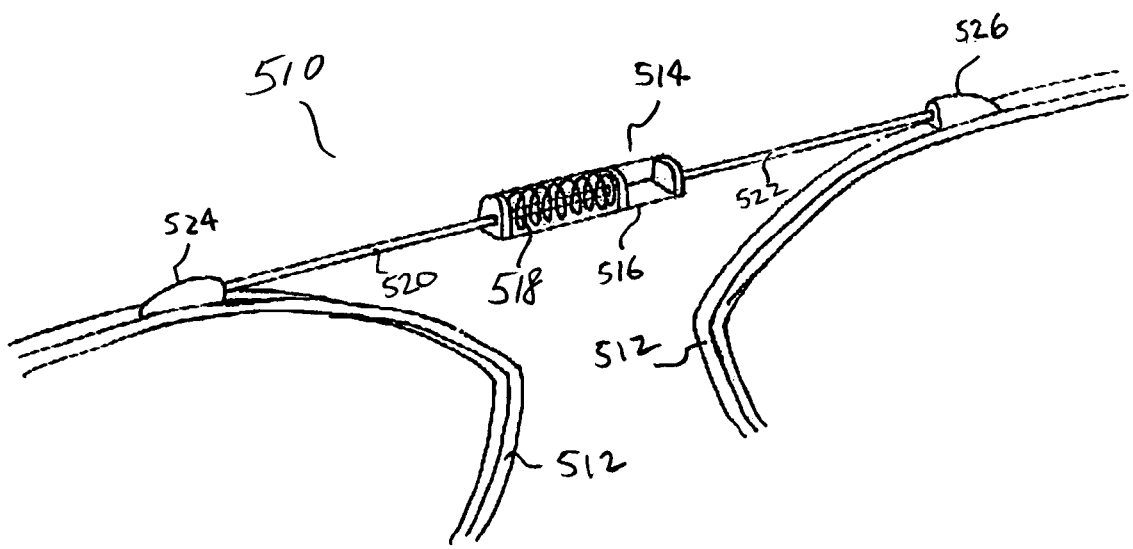
FIG. 5B is a partial view of an auxiliary frame according to another embodiment of the present invention.

FIG. 5B is a partial view of an auxiliary frame 510 according to another embodiment of the present invention. The auxiliary frame 510 has a pair of rims 512 and a resilient structure 514. The rims can hold onto the lenses. The resilient structure 514 is attached to the pair of rims 512, and is located on top of the rims from the elevation perspective. The resilient structure 514 serves as a resilient bridge that holds the pair of rims 512 together in a resilient manner. The resilient structure 514 has a cover or housing 516 that encloses a spring 518; a fixed rod 522; a rod 520 going in and out of the cover; and connection structures 524 and 526. The housing 516 provides complete or partial coverage of the spring 518. The rods 520 and 522 connect the spring 518 and the housing 516 between the corresponding connection structures 524 and 526.

Figure 6B:
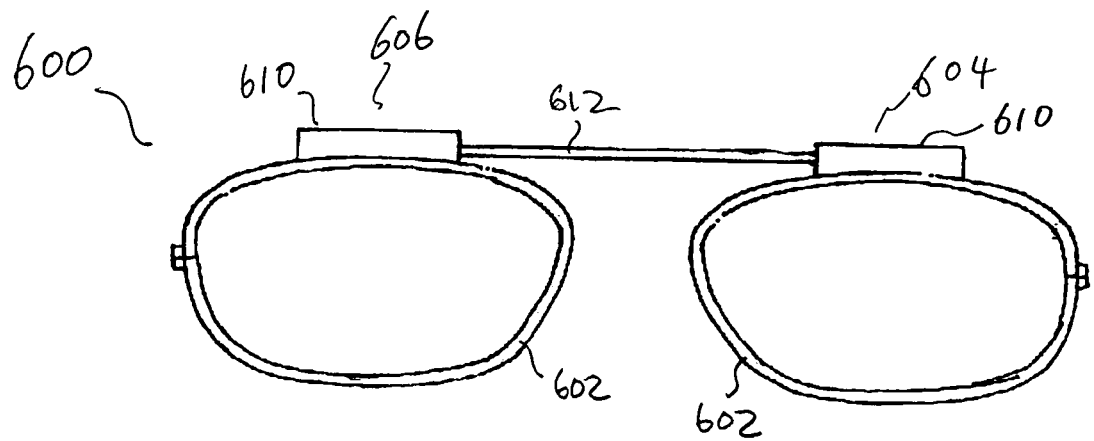
FIG. 6B is a front view of the auxiliary frame shown in FIG. 6A according to one embodiment of the present invention.
Figure 6A:
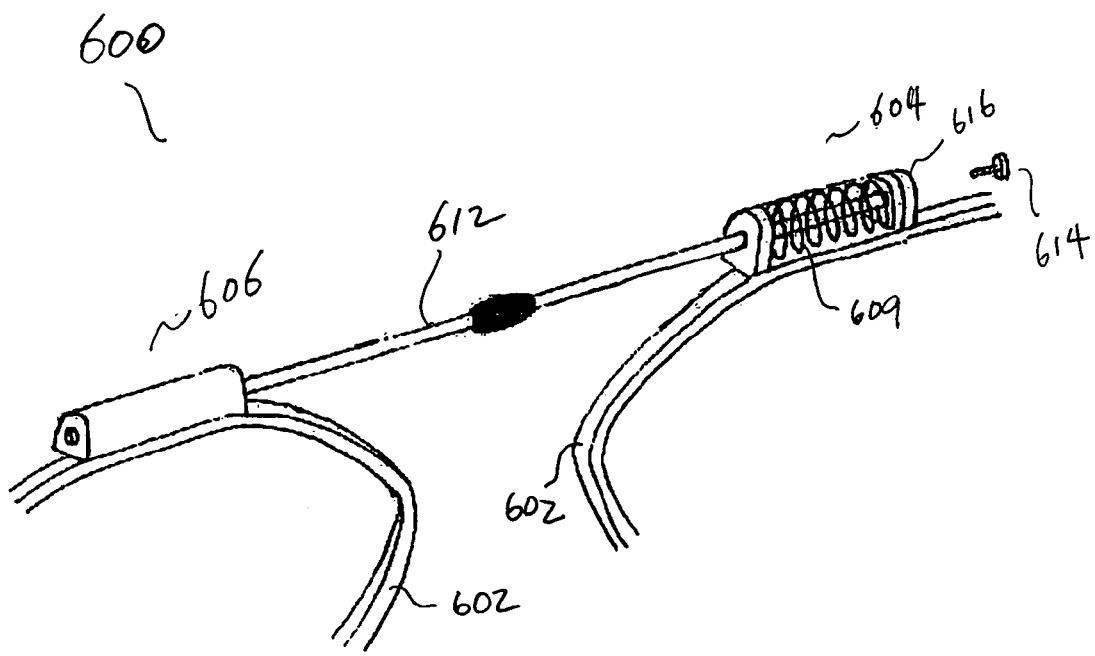
FIG. 6A is a partial view of an auxiliary frame according to yet another embodiment of the present invention.

The resilient structure does not have to be located in between the rims. FIGS. 6A and 6B show resilient structures embedded over at least one of the rims or lens holding element according to different embodiments of the present invention.

FIG. 6A is a partial view of an auxiliary frame 600 according to another embodiment of the present invention. The auxiliary frame 600 has a pair of rims 602, a first bridge portion 604 and a second bridge portion 606. The first bridge portion 604 contains a resilient structure 609. More particularly, as shown in FIG. 6A, the rim 602 can have an extension 616, which is affixed to the first bridge portion 604 by a screw 614. The resilient structure 609 can include a spring that provides resiliency. A rod 612 connects the first bridge portion 604 with the second bridge portion 606.

FIG. 6B is a front view of the auxiliary frame 600 shown in FIG. 6A The design provides symmetry due to the first and second bridge portions 604 and 606. One or both of the first and second bridge portions 604 and 606 can include a resilient structure. The first and second bridge portions 604 and 606 have external covers 610 to enhance design look and aesthetics. The first and second bridge portions 604 and 606 can be attached to the respective rims 602 in a variety of different ways, including adhesive, screws or solder. As the rims 602 are separated farther apart, the return force (or bias force) operates to pull the rims 612 closer together.

Figure 7A:
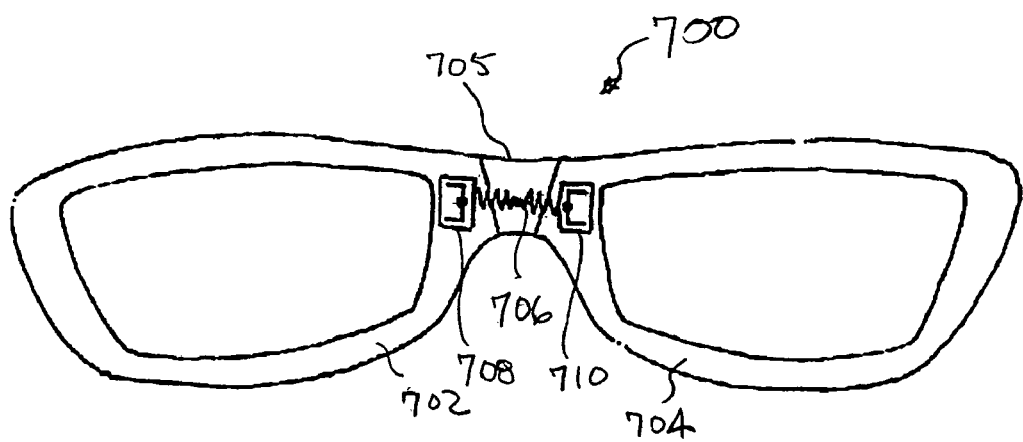

FIGS. 7A–G show different embodiments in which the resilient structure can be more inconspicuous. FIG. 7A is a rear view of an auxiliary frame 700 according to one embodiment of the present invention. The auxiliary frame 700 has a first side 702 and a second side 704 that are coupled together at a bridge region 705. A spring 706 is attached to a left-side bridge portion 708 and to a right-side bridge portion 710. The spring 706 operates as at least a portion of the resilient structure.

Figure 7B:
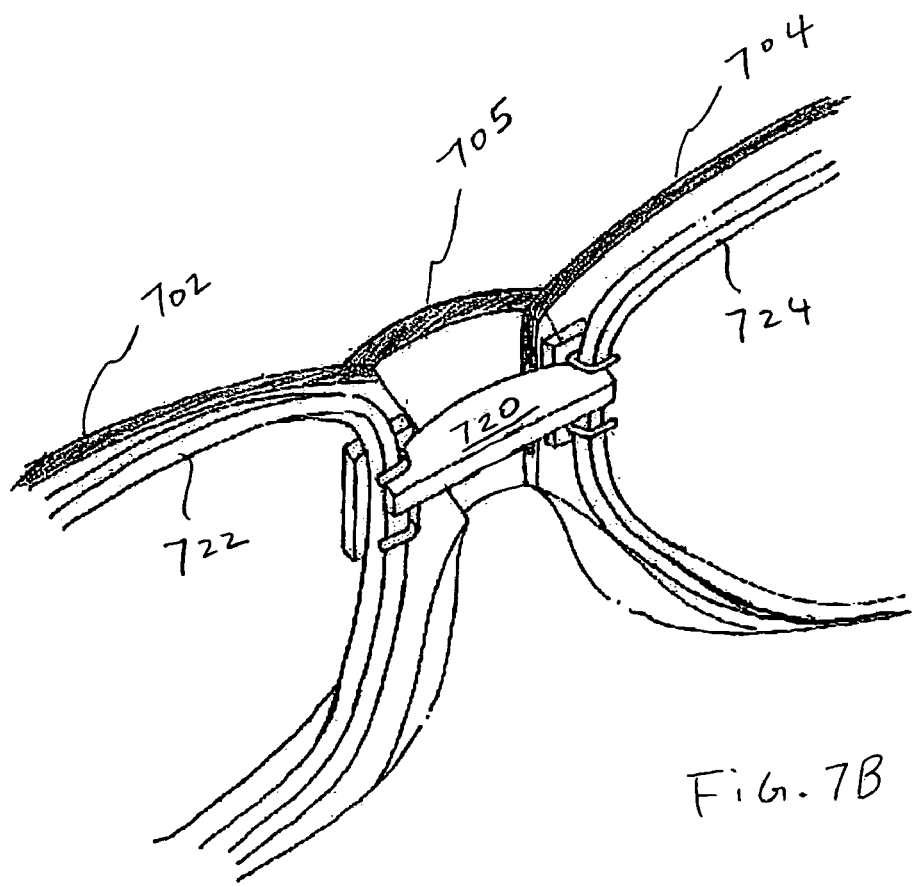

FIG. 7B is a partial rear view of the auxiliary frame 700 attached to a primary frame according to one embodiment of the present invention. The bridge region 720 of the primary frame couples the rims 722 and 724 together.

FIGS. 7C–D show one embodiment for the bridge region 705 of the auxiliary frame 700. As shown in FIG. 7C, the bridge portion 705 includes a plurality of studs, each with an enlarged tip. One of the stubs 732 is depicted in the figure. Each stud can fit into a slot, 734 and 736, and can slide along the slot. The flexibility provided by the sliding motion allows the auxiliary frame to expand and contract. FIG. 7D shows the top view of the bridge portion 705, with the stubs fitted into the slots.

FIG. 7E is a top view, FIG. 7F is a front view and FIG. 7G is a rear view of an auxiliary frame 740 according to different embodiments of the present invention. The auxiliary frame includes a first side 744, a second side 742 and a bridge spacer 746. The bridge spacer 746 is held between the first and second sides 744 and 742 by one or more spring 748. As shown in FIGS. 7C and 7D, the first and second sides 744 and 742 are pulled apart such that the spring 748 is extended and produces a resilient force to pull the first and second sides 744 and 742 back together.

FIG. 7G is a partial portion of the rear view of the auxiliary frame 740 according to one embodiment of the invention. The resilient structure 748 includes a first spring 770 in a first housing 776, a second spring 772 in a second housing 778, a rod 774 and an attachment 780. The first housing 776 connects to the first side 744, with a disc inside the housing linked to a first end of the rod 774. The second housing 778 connects to the second side 742, with a disc inside the housing linked to a second end of the rod 774. The rod 774 is attached to the bridge spacer 746 by the attachment 780. As shown in FIG. 7G, the first and second sides 744 and 742 are pulled together by the first spring 770 and/or the second spring 772.

Figure 8A:
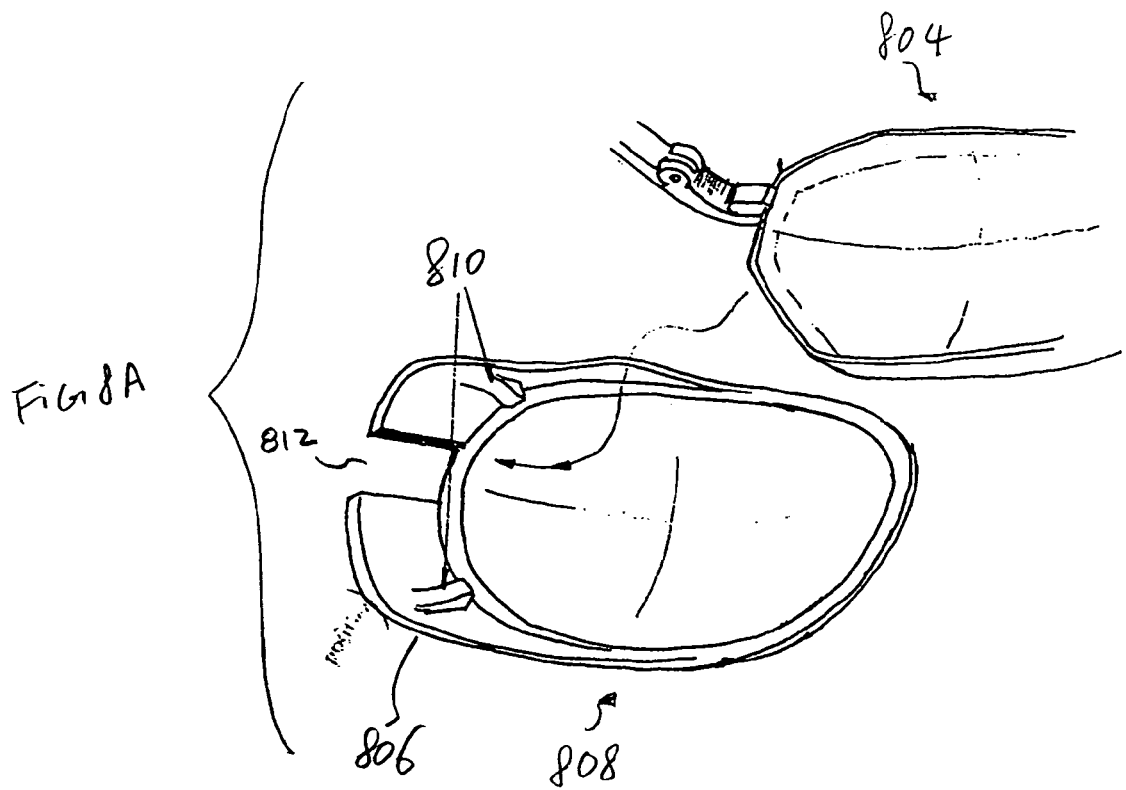
FIGS. 8A and 8B are partial perspective views of an assembly of a primary frame with an auxiliary frame, with different retaining structures, according to an embodiment of the present invention.
Figure 8B:
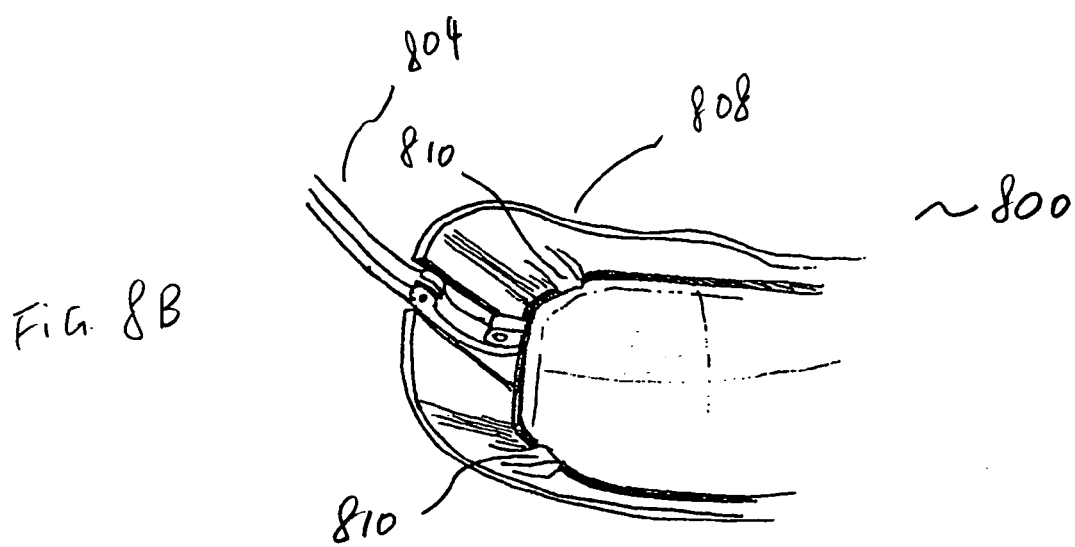

FIGS. 8A and 8B are partial perspective views of an assembly 800 of a side 802 of a primary frame 804 with an auxiliary frame 808 according to an embodiment of the invention. The shield 806 includes retaining structures 810 and an opening (notch) 812. As illustrated in FIG. 8A, the retraining structures 810 are not positioned adjacent to the opening 812 but are instead positioned further towards the top and bottom of the shield 806. In FIG. 8B, the primary frame 804 is prevented from being detached from the auxiliary frame 808 by the retaining structures 810. Thus, the retaining structures 810 can be at different locations inside the shields to serve their purposes. The one or more structures 810 can be at the side shields, the top shields or the bottom shields, according to different embodiments of the present invention.

Figure 9:
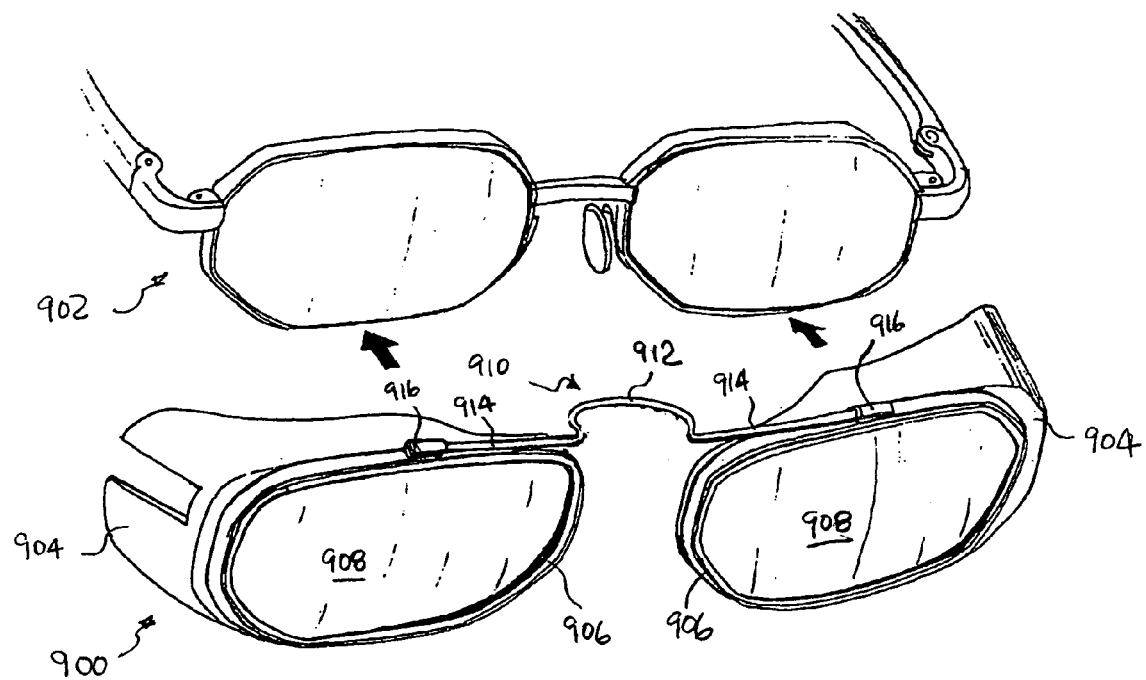
FIG. 9 is a perspective diagram of an assembly of an auxiliary frame with a bridge having memory materials, and a primary frame according to one embodiment of the present invention.

FIG. 9 is a perspective view of an assembly of an auxiliary frame 900 with a bridge with memory materials, and a primary frame 902 according to one embodiment of the present invention. The auxiliary frame 900 includes shields 904, rims 906 (e.g., wire rims) and lenses 908. A bridge 910 couples the pair of sides of the auxiliary frame 900 together. The bridge 910 is resilient. In this embodiment, a resilient element 912 of the bridge 910 is made of memory materials, such as a memory wire. The memory wire can be elongated but its "memory" causes it to attempt to return to its original shape. The resilient element 912 connects to the rims 906 via rods 914, which can be wires. In one implementation, the rods 914 can attach to tabs (or rim locks) 916 on the rims.

Another aspect of the present invention pertains to auxiliary frames fitted over primary frames using magnetic forces. The auxiliary frames can also have shields (or shielding extensions) that serve to impede undesired light.

Figure 10A:
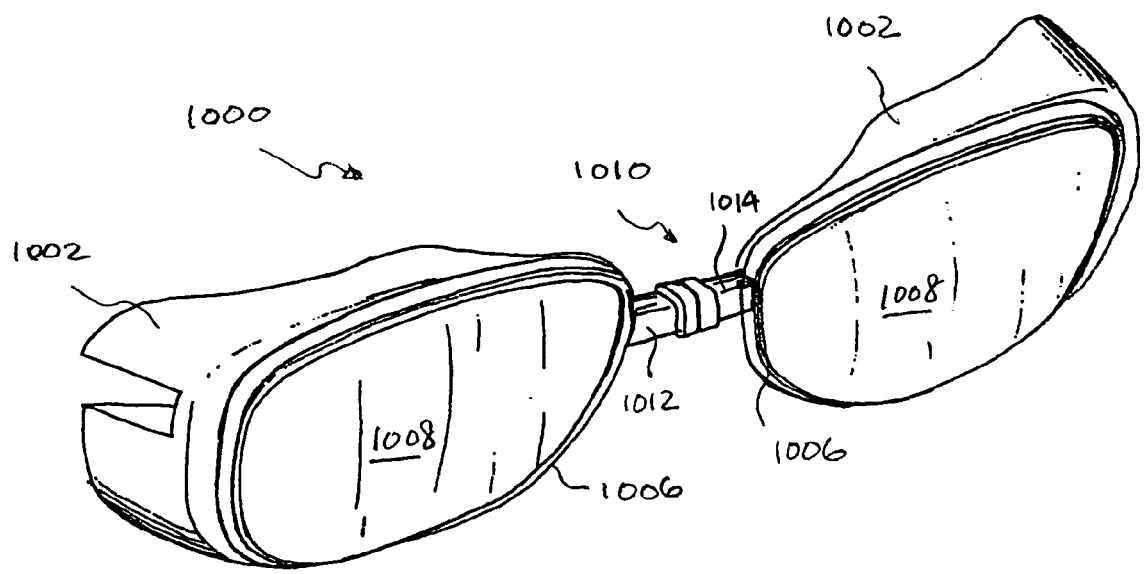
FIGS. 10A and 10B are perspective diagrams of an auxiliary frame using magnetic forces according to one embodiment of the present invention.
Figure 10B:
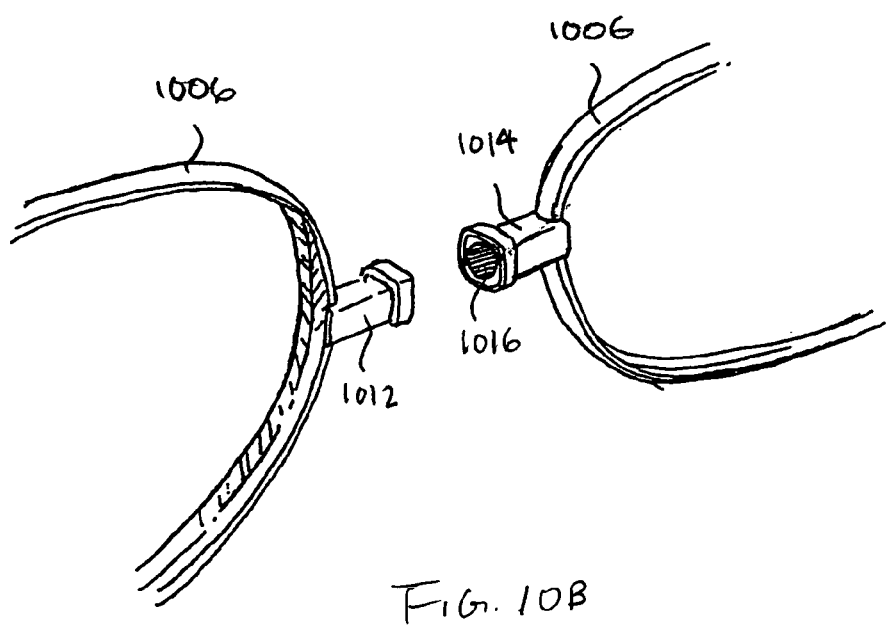

FIGS. 10A and 10B are perspective diagrams of an auxiliary frame 1000 with a magnetic element according to one embodiment of the present invention. The auxiliary frame 1000 includes shields 1002, lens holding elements 1006, and lenses 1008. A bridge 1010 of the auxiliary frame 1000 has a first side 1012 associated with one side of the auxiliary frame 1000 and has a second side 1014 associated with another side of the auxiliary frame 1000. When the first and second sides of the auxiliary frame 1000 are in an attached position, the first and second sides 1012 and 1214 are coupled. In one implementation, the cross-section of the first and second sides 1012 and 1214 is other than circular, such as rectangular as shown in FIG. 10B, so that the first and second sides 1012 and 1014 do not freely rotate relative to one another when attached. Further, at least one of the first and second sides 1012 and 1014 contains a magnet 1016. The other of the first and second sides 1012 can include an oppositely polarized magnet or a metal surface that attracts magnets. The magnet 1016 serves to hold the first side and the second side of the auxiliary frame 1000 in the attached position as shown in FIG. 10B.

A number of embodiments have been described in which the auxiliary frames have resilient structures and shields with openings and retaining structures. In yet another embodiment of the invention, a primary frame also has one or more of the different structural components described above. In this embodiment, a primary frame can have a resilient structure at its bridge to allow it to adapt to different types of users. These primary frames are able to be relatively universal. They can be comfortably fitted to people whose heads are of different sizes and shapes. The primary frame can also include shields (or shielding extensions) that serve to impede undesired light. Such a primary frame is also well suited for sunglasses. FIGS. 11A–12C describe different embodiments of such primary frames according to the present invention.

Figure 11A:
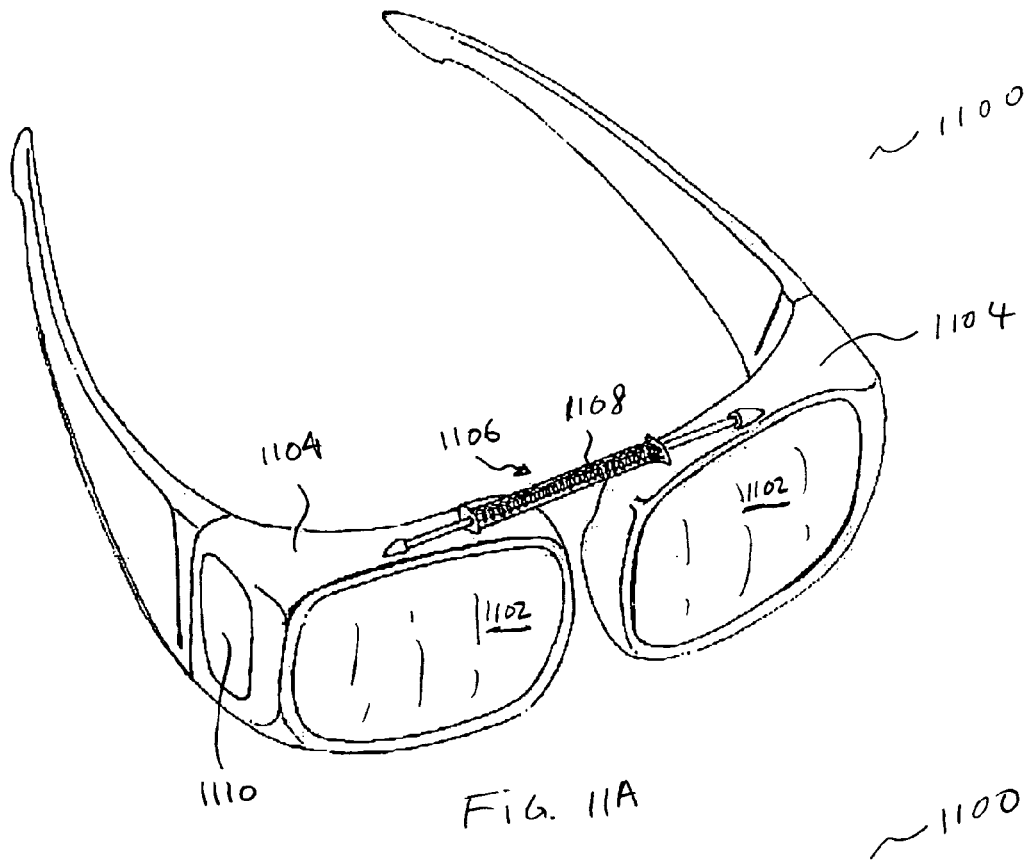
FIGS. 11A–11B are views of a primary frame with a resilient structure and shields according to an embodiment of the present invention.
Figure 11B:
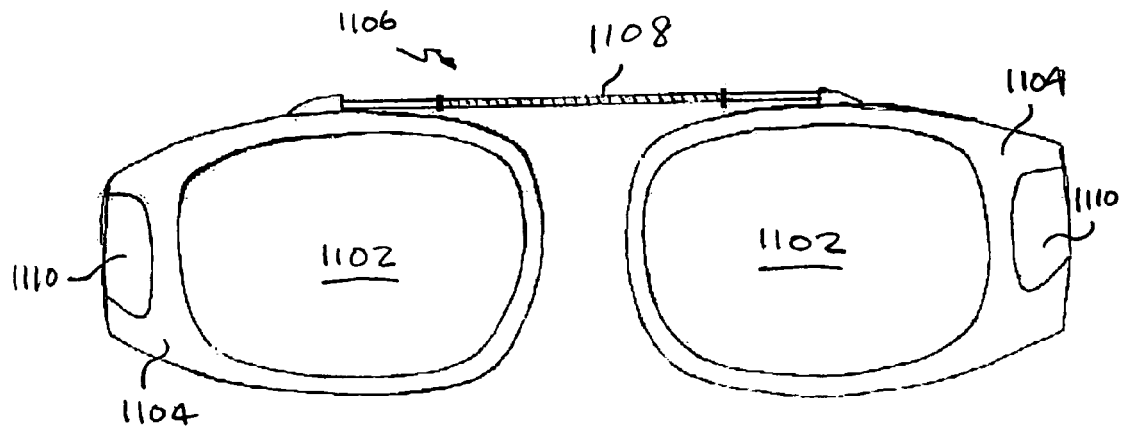

FIG. 11A provides a perspective view, and FIG. 11B provides a front view of one embodiment of such a primary frame 1100. The primary frame 1100 has shields 1104, similar to some of the embodiments described above. When separate lens holding elements are not provided, the shields 1104 can serve to hold lenses 1102 in position. Further, the primary frame 1100 also includes a bridge 1106 having a resilient structure 1108. The type and characteristics of the resilient structure 1108 can vary, such as in any of the embodiments noted above. In one implementation, the frame 1100 pertains to sunglasses. Optionally, as noted above for other embodiments, a side portion of the shield 1104 can include a transparent or tinted window, or one or more holes or slots 1110 to facilitate the use of peripheral vision by the wearer.

Figure 12A:
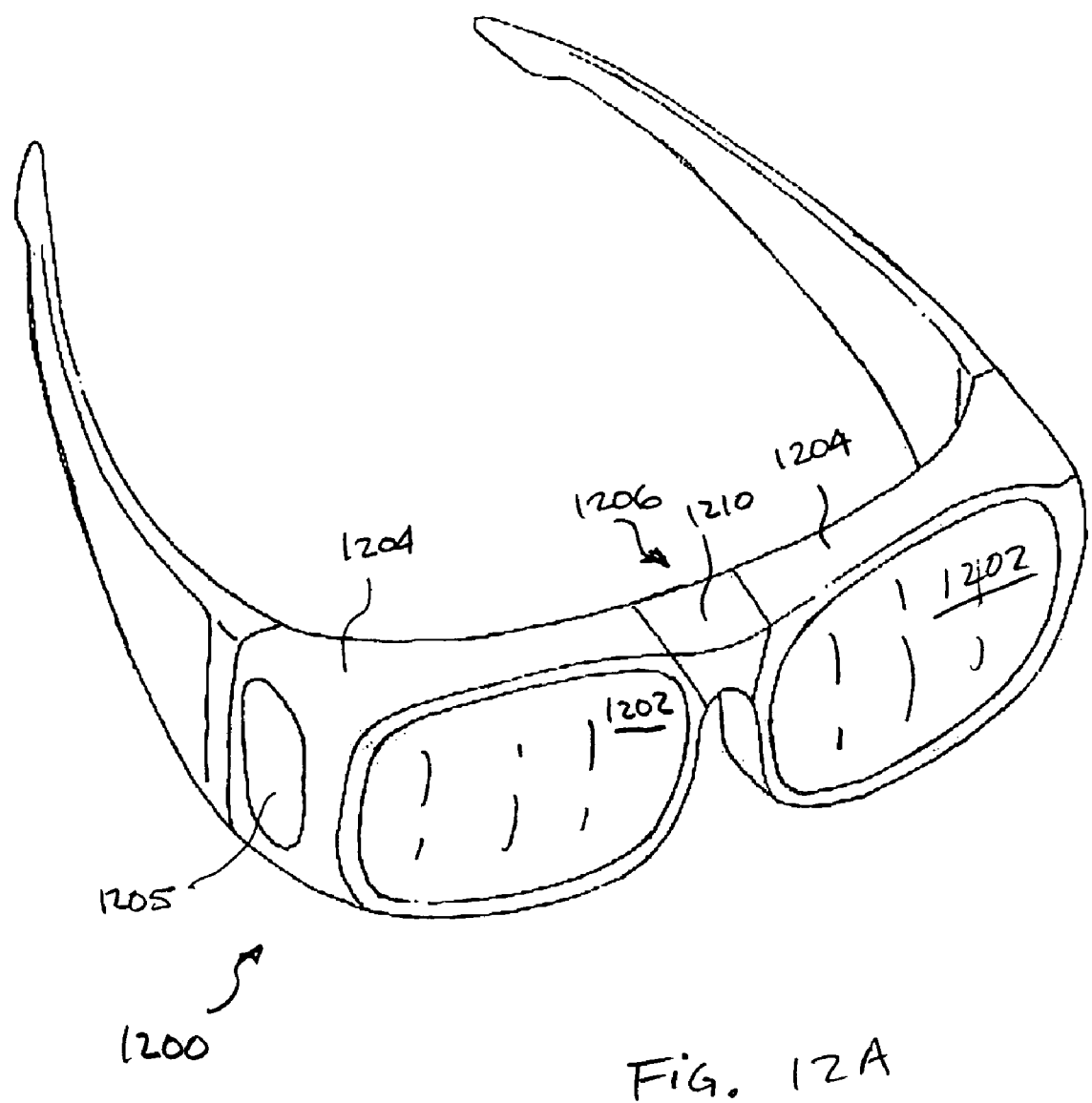
FIGS. 12A, 12B and 12C are views of a primary frame with a resilient structure and shields according to another embodiment of the present invention.
Figure 12B:
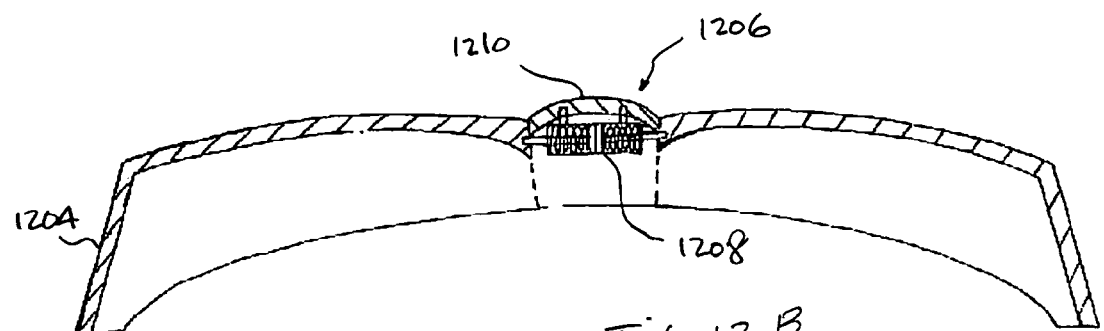
Figure 12D:
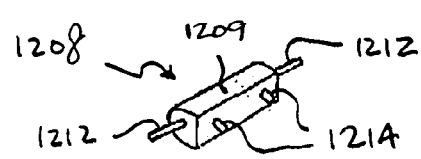
FIG. 12D is a perspective view of a resilient structure according to one embodiment of the present invention.
Figure 12C:
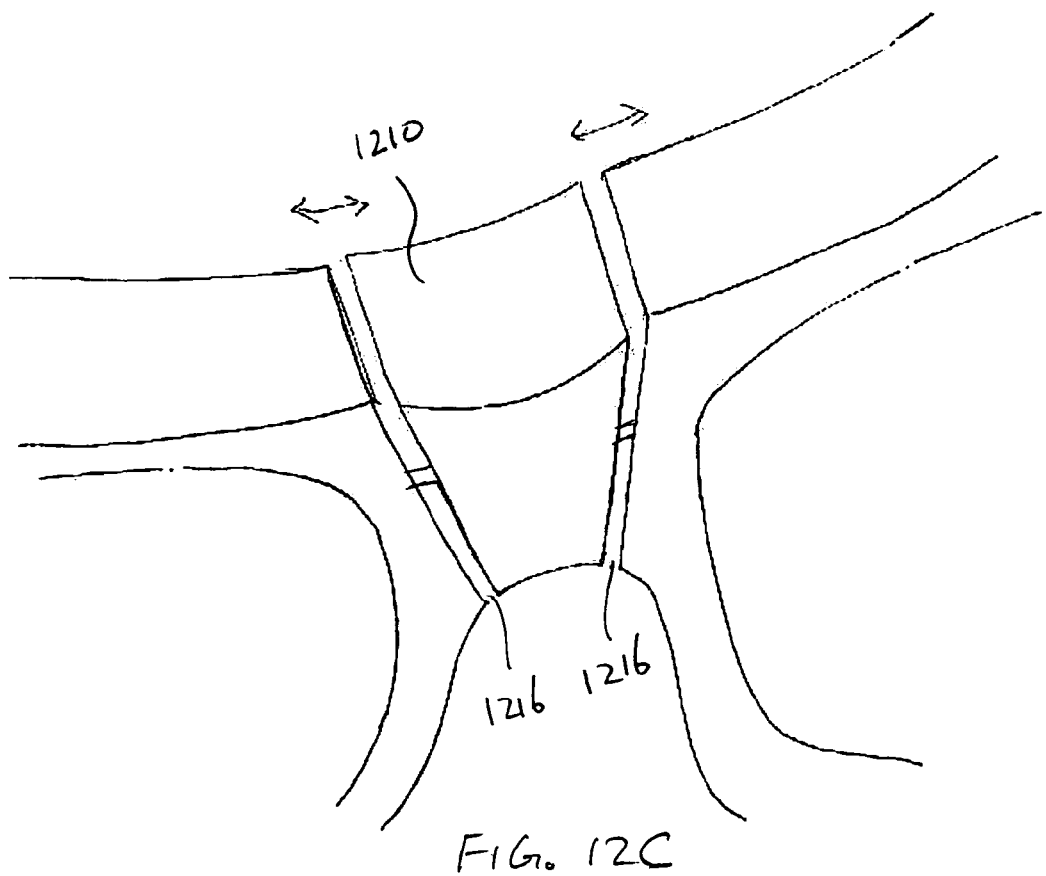

FIGS. 12A, 12B and 12C are views of a primary frame 1200, with shields and resilient structures according to another embodiment of the present invention. FIG. 12A provides a perspective view, FIG. 12B provides a cross-sectional top view, and FIG. 12C provides a partial view of a bridge region. The primary frame 1200 has a resilient quality that can facilitate adapting the frame 1200 to better fit a user's head. In one implementation, the frame 1200 pertains to sunglasses.

The frame 1200 has a pair of lenses 1202. In addition, the eyeglass frame 1200 has shields 1204 with lens holding elements, such as any of the embodiments noted above. Optionally, as noted above for other embodiments, a side portion of the shield 1204 can include a transparent or tinted window, or one or more openings 1205 to facilitate a user's use of her peripheral vision.

In certain aspect, the primary frame 1200 is similar to the primary frame 1100 shown in FIGS. 11A and 11B, but utilizes a different type of resilient structure. In particular, the frame 1200 has a bridge 1206 that includes a resilient structure 1208 as well as a bridge spacer 1210, such as the one shown in FIG. 7C. The spacer can provide a cover for the resilient structure 1208 for improved design or aesthetic purposes. As shown in FIG. 12B the resilient structure 1208 can utilize a spring for resiliency. However, the type and characteristics of the resilient structure 1208 can vary, such as in the embodiments noted above.

FIG. 12D is a perspective view of a resilient structure 1208 according to one embodiment of the present invention. The resilient structure 1208 has a housing 1209, slideable posts 1212 and support posts 1214. The housing contains one or more springs for resiliency. The slideable posts 1212 are connected to the one or more springs within the housing 1209. When the resilient structure 1208 is assembled into the frame 1200, the slideable posts 1212 can attach to respective sides of the shields 1204, thereby permitting the separation distance of the lenses 1202 to increase. When the separation distance is increased, the springs within the housing 1209 provides a return force (e.g. bias force) to pull the sides of the shields 1204 together. The bridge spacer 1210 can also provide a structure (i.e., structural support) against which the sides of the shields 1204 can rest when they are in an unexpanded position. As shown in FIG. 12C, when the shields 1204 have been expanded beyond the unexpanded position, there can be gaps 1216 between the sides of the bridge spacer 1210 and the sides of the shields 1204.

Figure 13A:
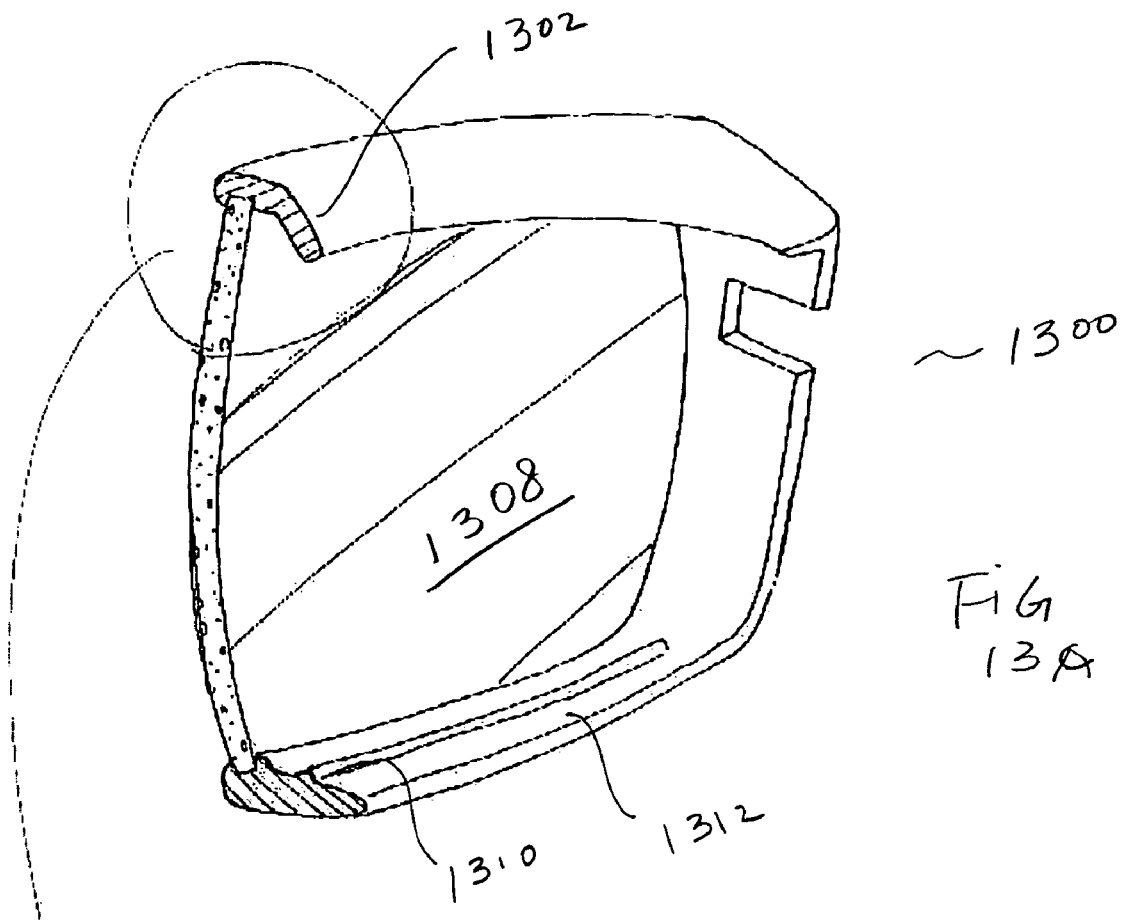
FIGS. 13A–B show one embodiment of the retaining mechanism achieved by modifying the structure of shields.
Figure 13B:
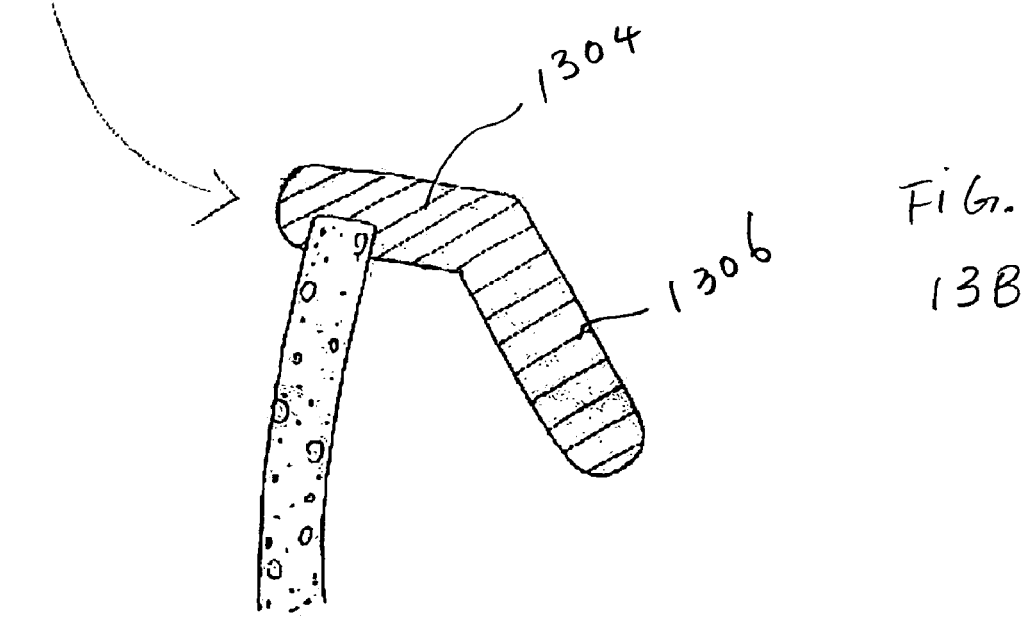

A number of embodiments have been described regarding retaining structures, such as the structures 116 shown in FIG. 1. The retaining structures assist in maintaining auxiliary frames of the present invention to be fitted over primary frames. Different retaining mechanisms described include additional retaining structures. In one embodiment, the retaining mechanism is achieved by modifying the structure of shields, such as by having the shields inclined inwards by a certain degree. For example, the side shields can be inclined inwards towards the bridge, or the top and the bottom shields can be inclined inwards towards the middle of their respective lenses. Such inward inclination prevents the auxiliary frame from being unintentionally detached from the primary frame. Again, the resilient mechanism holds the auxiliary frame in position with respect to the primary frame by pushing the shields inwards towards the primary frame. And, by being slightly inclined, the inner surfaces of the shields prevent the auxiliary frames from being inadvertently detached from the primary frames. FIGS. 13A–B show examples of such embodiments. FIG. 13A shows the rear view of a portion of an auxiliary frame 1300. As shown in the figure, a section of the top shield 1302 bends inwards. FIG. 13B magnifies the bent shield according to one embodiment. In this embodiment, the shield includes two sections, one substantially perpendicular to the lens 1308, and the other extended therefrom at an obtuse angle. In one embodiment, there can also be a ridge 1310 at the inner surface of the bottom shield 1312, to further strengthen the retaining mechanism.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, and components have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

The invention claimed is:

1. A primary frame suitable for a pair of conventional eyeglasses, comprising:
    a pair of lens holding elements to receive lenses;
    a pair of shields, each of the shields coupling to one of the lens holding elements and restricting light from passing through; and
    a resilient structure that is biased to pull the pair of lens holding elements close together such that a separation distance between the pair of lens holding elements is adjustable.

2. A primary frame as recited in claim 1, wherein said frame further comprise a bridge spacer held between the lens holding elements and the shields by the resilient structure, wherein the spacer can provide a cover for at least a portion of the resilient structure for improved aesthetic purposes.

3. A primary frame as recited in claim 1, wherein each of the shields has at least a side shield portion and a top shield portion, and wherein at least a part of each of the side shield portions includes one of an opening, a partially transparent or a clear area through which a user of the frame is able to see by way of peripheral vision.

* * * * *